(12) United States Patent
Komatsu et al.

(10) Patent No.: US 11,136,435 B2
(45) Date of Patent: *Oct. 5, 2021

(54) METHOD FOR PRODUCING POLYIMIDE FILM, POLYIMIDE FILM, POLYAMIC ACID SOLUTION, AND PHOTOSENSITIVE COMPOSITION

(71) Applicants: ENEOS CORPORATION, Tokyo (JP); TOKYO OHKA KOGYO CO., LTD., Kawasaki (JP)

(72) Inventors: Shinichi Komatsu, Tokyo (JP); Kunihiro Noda, Kawasaki (JP); Hiroki Chisaka, Kawasaki (JP); Dai Shiota, Kawasaki (JP)

(73) Assignees: ENEOS CORPORATION, Tokyo (JP); TOKYO OHKA KOGYO CO., LTD., Kawasaki (JP)

( * ) Notice: Subject to any disclaimer, the term of this patent is extended or adjusted under 35 U.S.C. 154(b) by 240 days.

This patent is subject to a terminal disclaimer.

(21) Appl. No.: 16/070,401

(22) PCT Filed: Jan. 12, 2017

(86) PCT No.: PCT/JP2017/000828
§ 371 (c)(1),
(2) Date: Jul. 16, 2018

(87) PCT Pub. No.: WO2017/126409
PCT Pub. Date: Jul. 27, 2017

(65) Prior Publication Data
US 2019/0062503 A1 Feb. 28, 2019

(30) Foreign Application Priority Data

Jan. 20, 2016 (JP) .............................. JP2016-009030

(51) Int. Cl.
*C08G 73/10* (2006.01)
*C08J 5/18* (2006.01)
(Continued)

(52) U.S. Cl.
CPC ..... *C08G 73/1021* (2013.01); *C08G 73/1028* (2013.01); *C08G 73/1078* (2013.01);
(Continued)

(58) Field of Classification Search
None
See application file for complete search history.

(56) References Cited

U.S. PATENT DOCUMENTS

2013/0079490 A1   3/2013   Matsumoto et al.
2014/0234784 A1   8/2014   Chisaka et al.
(Continued)

FOREIGN PATENT DOCUMENTS

WO       2011/099518 A1       8/2011
WO       WO-2013021942 A1 *   2/2013   .............. C08L 79/08
(Continued)

OTHER PUBLICATIONS

Oct. 4, 2019 Extended European Search Report issued in European Patent Application No. 17741289.7.
(Continued)

*Primary Examiner* — Rachel Kahn
(74) *Attorney, Agent, or Firm* — Oliff PLC

(57) ABSTRACT

A method for producing a polyimide film includes: obtaining a polyamic acid solution having a viscosity of 5 to 150 cps by preparing a raw material mixture liquid containing a solvent, a tetracarboxylic dianhydride represented by a specific general formula, and an aromatic diamine represented by a specific general formula, and has a total content of the tetracarboxylic dianhydride and aromatic diamine of 15% by mass or less, and reacting the tetracarboxylic dianhydride
(Continued)

and aromatic diamine with each other in the raw material mixture liquid forming a polyamic acid having a repeating unit represented by a specific general formula; obtaining a polyimide-forming mixture liquid by adding a compound represented by a specific general formula to the polyamic acid solution; and obtaining a polyimide film represented by a specific general formula by forming a film made of the polyimide-forming mixture liquid, followed by imidization of the polyamic acid in the film.

7 Claims, 3 Drawing Sheets

(51) Int. Cl.
    *C08K 5/00*     (2006.01)
    *C09D 179/08*     (2006.01)

(52) U.S. Cl.
    CPC   *C08J 5/18* (2013.01); *C08K 5/00* (2013.01); *C09D 179/08* (2013.01); *C08G 2150/00* (2013.01); *C08J 2379/08* (2013.01)

(56) References Cited

U.S. PATENT DOCUMENTS

| | | |
|---|---|---|
| 2014/0363687 A1 | 12/2014 | Nakayama et al. |
| 2018/0194930 A1* | 7/2018 | Noda ............... C08K 5/3445 |
| 2019/0225804 A1* | 7/2019 | Noda ............... C08G 73/1071 |

FOREIGN PATENT DOCUMENTS

| | | |
|---|---|---|
| WO | 2013/168691 A1 | 11/2013 |
| WO | 2015/080158 A1 | 6/2015 |
| WO | 2016/158679 A1 | 10/2016 |

OTHER PUBLICATIONS

Feb. 7, 2017 International Search Report issued in Patent Application No. PCT/JP2017/000828.

* cited by examiner

METHOD FOR PRODUCING POLYIMIDE FILM, POLYIMIDE FILM, POLYAMIC ACID SOLUTION, AND PHOTOSENSITIVE COMPOSITION

This application is a result of activities undertaken within the scope of a joint research agreement between JXTG NIPPON OIL & ENERGY CORPORATION and TOKYO OHKA KOGYO CO., LTD. that was in effect on or before the date the research leading to this application was made.

TECHNICAL FIELD

The present invention relates to a method for producing a polyimide film, a polyimide film, a polyamic acid solution, and a photosensitive composition.

BACKGROUND ART

Heretofore, glass substrates have been used as substrates in various fields (for example, as substrates of mobile devices such as smartphones and tablet terminals). However, glass substrates have a problem of being fractured by a shock, and hence there has been a demand for the development of a material which is sufficiently high in light-transmitting properties and has a sufficiently high heat resistance, while being light in weight and flexible. In this respect, polyimides having high heat resistance and being light in weight and flexible have attracted attentions as materials used for such applications as an alternative to glass and other applications.

Known examples of such polyimides include aromatic polyimides (for example, one manufactured by DuPont under the trade name of "Kapton"). However, although the aromatic polyimides are polyimides having sufficient flexibility and high heat resistance, the aromatic polyimides are colored in brown, and hence cannot be used in applications as an alternative to glass, optical applications, or the like, where light-transmitting properties are necessary. For this reason, development of alicyclic polyimides which have so sufficient light-transmitting properties as to be usable in applications as an alternative to glass, and the like have been advanced recently.

A known example of such an alicyclic polyimide having sufficient light-transmitting properties and high heat resistance is a polyimide having a repeating unit represented by the specific general formula as described in International Publication No. WO2011/099518 (PTL 1). Note that the above-described PTL 1 discloses, for example, a method in which a film made of a polyimide is formed by forming a polyamic acid solution, then forming a coating film of the polyamic acid solution, and curing the coating film (see Example 7 etc. of PTL 1).

CITATION LIST

Patent Literature

[PTL 1] International Publication No. WO2011/099518

SUMMARY OF INVENTION

Technical Problem

In the field of such films made of a polyimide, applying these films to various applications have been attempted, and it may be desirable that such a film have a higher surface smoothness (have a surface roughness lowered by a higher degree) in some cases depending on the applications and the like. Especially when a polyimide film is used as a substrate of an organic EL, a high surface roughness may cause a short circuit between electrodes, resulting in a problem of no light emission. For this reason, it is more desirable to make the surface smoothness of the film higher. From such a viewpoint, there is a demand for the development of a method for producing a polyimide film which makes it possible to more efficiently produce a film having a higher surface smoothness than in a case where a conventional method for producing a polyimide film is used.

The present invention has been made in view of the problem of the above-described conventional technique, and an object of the present invention is to provide a method for producing a polyimide film which makes it possible to efficiently produce a film having a higher surface smoothness, a polyimide film obtained by using the production method, a polyamic acid solution preferably usable for producing the polyimide film, and a photosensitive composition comprising the polyamic acid solution.

Solution to Problem

Based on the fact that polyamic acid solutions (resin solutions: varnishes) obtained when known methods for producing polyimide films are used have basically high viscosities, the present inventors first have speculated that the formation of a polyamic acid solution having a low viscosity would further improve the workability of the solution (varnish) during coating, and make it possible to more efficiently produce a film having a higher surface smoothness. Based on the speculation, the present inventors have first attempted to sufficiently lower the viscosity of a polyamic acid solution (resin solution: varnish). Note that when a polyamic acid solution having a high viscosity is formed, it is not possible to use coating apparatuses which can use only a solution having a low-viscosity. Hence, also from the viewpoint of making a varnish usable with various coating apparatuses, it is desirable to form a polyamic acid solution having a sufficiently low viscosity. However, when a polyamic acid was prepared by employing a known method for producing a polyimide, obtained were polyamic acid solutions (varnishes) having high viscosities, such as those basically having viscosities of about several thousand cps to about several tens of thousands cps. Even when lowering the viscosities was attempted by further adding a solvent thereto, it was difficult to form polyamic acid solutions having sufficiently low viscosities of 5 to 150 cps.

In this respect, in order to lower the viscosity of a polyamic acid solution (resin solution: varnish), the present inventors attempted to allow a reaction of raw material compounds to proceed in the presence of a large amount of a solvent by using the solvent in a large amount for the preparation of the polyamic acid solution from the beginning. However, when the thus obtained polyamic acid solution was used as it was, problems were presented such as formation of cracks in a film obtained by imidization of the polyamic acid in some cases, and this polyamic acid solution was not necessarily sufficient from the viewpoint of efficiently forming a polyimide film. As described above, when a polyamic acid solution having a low viscosity was prepared by simply using a large amount of a solvent, it was difficult to obtain a uniform film (crack-free film) having a sufficient mechanical strength in some cases, and it was not necessarily possible to efficiently produce a polyimide film.

As described above, simply when a conventionally known method for producing a polyimide was employed as it was, and then a solvent was added to the polyamic acid solution, or simply when the amount of the solvent used for the preparation of the polyamic acid was changed, it was difficult to form a polyamic acid solution having a sufficiently low viscosity, and efficiently form a polyimide film having a high surface smoothness by using the polyamic acid solution.

On the basis of such findings, the present inventors have further conducted intensive study to achieve the above-described object, and have found that a film made of a polyimide can be efficiently formed by imidization using a polyamic acid solution having a sufficiently low viscosity, such as one having a viscosity of 5 to 150 cps, and the obtained film can be made to have a higher surface smoothness, if a polyamic acid solution having a viscosity of 5 to 150 cps is obtained by preparing a raw material mixture liquid that contains a solvent, a specific tetracarboxylic dianhydride represented by the general formula (1) shown below, and a specific aromatic diamine represented by the general formula (2) shown below, and that has a total content of the tetracarboxylic dianhydride and the aromatic diamine of 15% by mass or less, and subsequently reacting the tetracarboxylic dianhydride and the aromatic diamine with each other in the raw material mixture liquid to form a polyamic acid having a specific repeating unit represented by the following general formula (3), then a polyimide-forming mixture liquid is formed by adding a compound represented by the following general formula (4) to the polyamic acid solution, subsequently, a film made of the polyimide-forming mixture liquid is formed, and then imidization of the polyamic acid in the film is allowed to proceed. This finding has led to the completion of the present invention.

Specifically, a method for producing a polyimide film of the present invention comprises the steps of:

obtaining a polyamic acid solution having a viscosity of 5 to 150 cps by preparing a raw material mixture liquid that contains
a solvent,
a tetracarboxylic dianhydride represented by the following general formula (1):

[Chem 1]

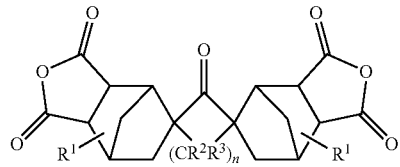

(1)

[in the formula (1), $R^1$, $R^2$, and $R^3$ each independently represent one selected from the group consisting of a hydrogen atom, alkyl groups having 1 to 10 carbon atoms, and a fluorine atom, and n represents an integer of 0 to 12], and
an aromatic diamine represented by the following general formula (2):

[Chem 2]

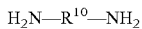

$H_2N-R^{10}-NH_2$ (2)

[in the formula (2), $R^{10}$ represents an aryl group having 6 to 50 carbon atoms], and that has a total content of the tetracarboxylic dianhydride and the aromatic diamine of 15% by mass or less, and reacting the tetracarboxylic dianhydride and the aromatic diamine with each other in the raw material mixture liquid to form a polyamic acid having a repeating unit represented by the following general formula (3):

[Chem 3]

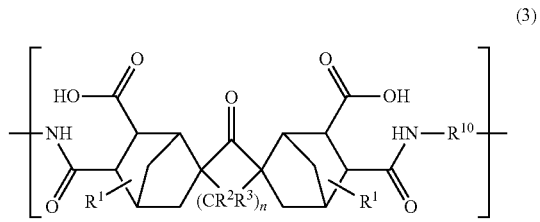

(3)

[in the formula (3), $R^1$, $R^2$, and $R^3$ each independently represent one selected from the group consisting of a hydrogen atom, alkyl groups having 1 to 10 carbon atoms, and a fluorine atom, $R^{10}$ represents an aryl group having 6 to 50 carbon atoms, and n represents an integer of 0 to 12];

obtaining a polyimide-forming mixture liquid by adding, to the polyamic acid solution, a compound represented by the following general formula (4):

[Chem 4]

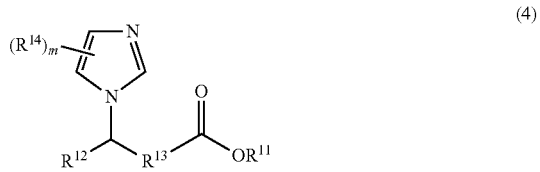

(4)

[in the formula (4), $R^{11}$ represents one selected from the group consisting of a hydrogen atom and alkyl groups, $R^{12}$ represents an optionally substituted aromatic group, $R^{13}$ represents an optionally substituted alkylene group, $R^{14}$s each independently represent one selected from the group consisting of halogen atoms, a hydroxy group, a mercapto group, a sulfide group, a silyl group, a silanol group, a nitro group, a nitroso group, a sulfonato group, a phosphino group, a phosphinyl group, a phosphonato group, and organic groups, and m represents an integer of 0 to 3]; and obtaining a film (polyimide film) made of a polyimide having a repeating unit represented by the following general formula (5):

[Chem 5]

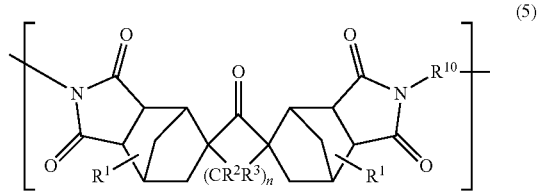

(5)

[in the formula (5), $R^1$, $R^2$, and $R^3$ each independently represent one selected from the group consisting of a hydrogen atom, alkyl groups having 1 to 10 carbon atoms, and a fluorine atom, $R^{10}$ represents an aryl group having 6 to 50 carbon atoms, and n represents an integer of 0 to 12] by forming a film made of the polyimide-forming mixture liquid, followed by imidization of the polyamic acid in the film.

In addition, a polyimide film of the present invention is one obtained by the above-described method for producing a polyimide film of the present invention.

In addition, a polyamic acid solution of the present invention comprises:
a solvent;
a polyamic acid having a repeating unit represented by the above-described general formula (3); and
a compound represented by the above-described general formula (4), wherein
the polyamic acid solution has a viscosity of 5 to 150 cps.

Moreover, a photosensitive composition of the present invention comprises:
the above-described polyamic acid solution of the present invention; and
a photosensitive agent.

Advantageous Effects of Invention

According to the present invention, it is possible to provide a method for producing a polyimide film which makes it possible to efficiently produce a film having a higher surface smoothness, a polyimide film obtained by using the production method, a polyamic acid solution preferably usable for producing the polyimide film, and a photosensitive composition comprising the polyamic acid solution.

DESCRIPTION OF EMBODIMENTS

Figure 1:
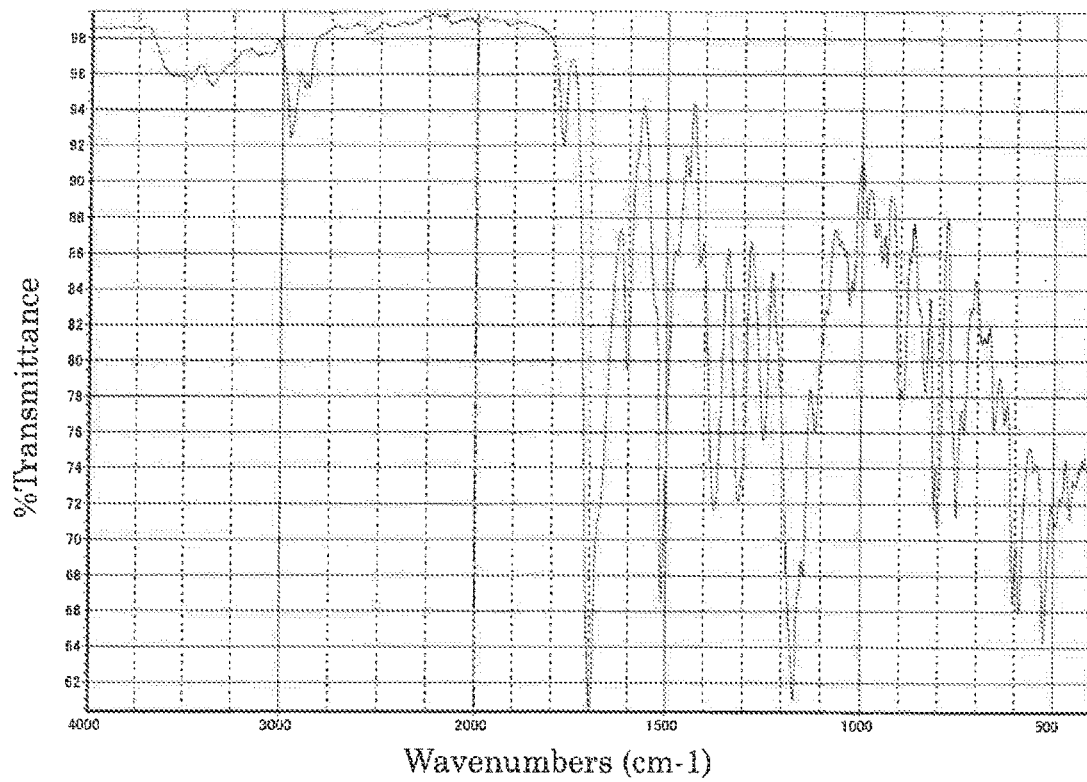
FIG. 1 is a graph showing an IR spectrum of a polyimide obtained in Example 1.

Hereinafter, the present invention will be described in detail based on preferred embodiments thereof.

[Method for Producing Polyimide Film of the Present Invention]

A method for producing a polyimide film of the present invention comprises the steps of:
obtaining a polyamic acid solution having a viscosity of 5 to 150 cps by preparing a raw material mixture liquid that contains
a solvent,
the tetracarboxylic dianhydride represented by the above-described general formula (1); and
the aromatic diamine represented by the above-described general formula (2), and that has a total content of the tetracarboxylic dianhydride and the aromatic diamine of 15% by mass or less, and reacting the tetracarboxylic dianhydride and the aromatic diamine with each other in the raw material mixture liquid to form a polyamic acid having a repeating unit represented by the above-described general formula (3);
obtaining a polyimide-forming mixture liquid by adding a compound represented by the above-described general formula (4) to the polyamic acid solution; and
obtaining a film (polyimide film) made of a polyimide having a repeating unit represented by the above-described general formula (5) by forming a film made of the polyimide-forming mixture liquid, followed by imidization of the polyamic acid in the film. Hereinafter, each of the steps of the above-described method for producing a polyimide film of the present invention is described separately. Note that, in the following description, the above-described step of obtaining a polyamic acid solution is simply referred to as "first step" in some cases, the above-described step of obtaining a polyimide-forming mixture liquid is simply referred to as in some cases "second step," and the step of obtaining a film made of a polyimide is simply referred to as "third step" in some cases, for convenience.

<Step of Obtaining Polyamic Acid Solution (First Step)>

The step of obtaining a polyamic acid solution according to the present invention is a step (first step) of obtaining a polyamic acid solution having a viscosity of 5 to 150 cps by preparing a raw material mixture liquid that contains
a solvent,
the tetracarboxylic dianhydride represented by the above-described general formula (1), and
the aromatic diamine represented by the above-described general formula (2), and that has a total content of the tetracarboxylic dianhydride and the aromatic diamine of 15% by mass or less, and reacting the tetracarboxylic dianhydride and the aromatic diamine with each other in the raw material mixture liquid to form a polyamic acid having a repeating unit represented by the above-described general formula (3).

The solvent used in the first step is not particularly limited, as long as it can be used for preparation of a polyamic acid. The solvent is preferably an organic solvent capable of dissolving both the tetracarboxylic dianhydride represented by the above-described general formula (1) and the aromatic diamine represented by the above-described general formula (2). Examples of the organic solvent preferable as the solvent used in the first step include aprotic polar solvents such as N-methyl-2-pyrrolidone, N,N-dimethylacetamide, N,N-dimethylformamide, dimethyl sulfoxide, γ-butyrolactone, propylene carbonate, tetramethylurea, 1,3-dimethyl-2-imidazolidinone, hexamethylphosphoric triamide, and pyridine; phenol-based solvents such as m-cresol, xylenol, phenol, and halogenated phenols; ether-based solvents such as tetrahydrofuran, dioxane, Cellosolve, glyme, diglyme, and propylene glycol monomethyl ether acetate; aromatic solvents such as benzene, toluene, and xylene; ketone-based solvents such as cyclopentanone and cyclohexanone; nitrile-based solvents such as acetonitrile and benzonitrile; and the like.

In addition, from the viewpoints of solubility and safety, the solvent is preferably tetramethylurea, N-methyl-2-pyrrolidone, N,N-dimethylacetamide, γ-butyrolactone, or 1,3-dimethyl-2-imidazolidinone, and more preferably tetramethylurea, γ-butyrolactone, or 1,3-dimethyl-2-imidazolidinone. One of these solvents may be used alone, or two or more thereof may be used as a mixture.

In addition, the tetracarboxylic dianhydride used in the above-described first step is one (a compound) represented by the above-described general formula (1) (Note that, in the above-described general formula (1), $R^1$, $R^2$, and $R^3$ each independently represent one selected from the group consisting of a hydrogen atom, alkyl groups having 1 to 10 carbon atoms, and a fluorine atom, and n represents an integer of 0 to 12).

The alkyl group which may be selected as $R^1$, $R^2$, or $R^3$ in the general formula (1) is an alkyl group having 1 to 10 carbon atoms. In addition, the number of carbon atoms of the alkyl group which may be selected as $R^1$, $R^2$, or $R^3$ is preferably 1 to 6, more preferably 1 to 5, further preferably 1 to 4, and particularly preferably 1 to 3. In addition, the alkyl group which may be selected as $R^1$, $R^2$, or $R^3$ may be linear or branched. Further, the alkyl group is more preferably a methyl group or an ethyl group.

$R^1$, $R^2$, and $R^3$ in the above-described general formula (1) are more preferably each independently a hydrogen atom or an alkyl group having 1 to 10 carbon atoms, more preferably each independently a hydrogen atom, a methyl group, an ethyl group, a n-propyl group, or an isopropyl group, and particularly preferably a hydrogen atom or a methyl group. In addition, multiple $R^1$s, $R^2$s, and $R^3$s in the formula are particularly preferably the same.

In addition, n in the above-described general formula (1) represents an integer of 0 to 12. In addition, an upper limit value of a numeric value range of n in the general formula (1) is more preferably 5, and particularly preferably 3. In addition, a lower limit value of the numeric value range of n in the general formula (1) is more preferably 1, and particularly preferably 2. As described above, n in the general formula (1) is particularly preferably an integer of 2 or 3.

A method for producing the tetracarboxylic dianhydride represented by the general formula (1) is not particularly limited, and a known method (for example, the method described in Example 2 or Example 4 of International Publication No. WO2011/099518 or the like) can be employed, as appropriate.

Meanwhile, the aromatic diamine used in the above-described first step is one (a compound) represented by the above-described general formula (2) (Note that $R^{10}$ in the above-described general formula (2) represents an aryl group having 6 to 50 carbon atoms).

The aryl group which may be selected as $R^{10}$ in the general formula (2) is one having 6 to 50 carbon atoms, and the number of carbon atoms of the aryl group is preferably 6 to 40, more preferably 6 to 30, and further preferably 12 to 20.

In addition, $R^{10}$ in the above-described general formula (2) is preferably at least one selected from groups represented by the following general formulae (6) to (9):

[Chem 6]

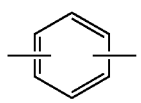
(6)

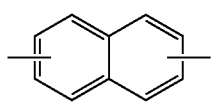
(7)

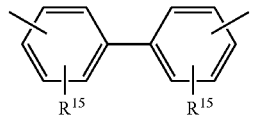
(8)

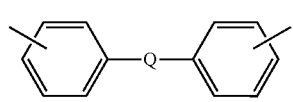
(9)

[$R^{15}$ in the formula (8) represents one selected from the group consisting of a hydrogen atom, a fluorine atom, a methyl group, an ethyl group, and a trifluoromethyl group, and Q in the formula (9) represents one selected from the group consisting of groups represented by the formulae: —O—, —S—, —CO—, —CONH—, —SO$_2$—, —C(CF$_3$)$_2$—, —C(CH$_3$)$_2$—, —CH$_2$—, —O—C$_6$H$_4$—C(CH$_3$)$_2$—CH$_4$—O—, —O—C$_6$H$_4$—C(CF$_3$)$_2$—C$_6$H$_4$—O—, —O—C$_6$H$_4$—SO$_2$—C$_6$H$_4$—O—, -C(CH$_3$)$_2$—C$_6$H$_4$—C(CH$_3$)$_2$—, —O—C$_6$H$_4$—CH$_4$—O—, and —O—C$_6$H$_4$—O—, a 9,9'-fluorenylidene group, and groups represented by the following general formula (10):

[Chem 7]

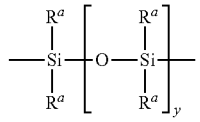
(10)

(in the formula (10), $R^a$s each independently represent any one selected from alkyl groups having 1 to 10 carbon atoms, a phenyl group, and a tolyl group, and y represents an integer of 1 to 18)].

From the viewpoint of the heat resistance of the obtained polyimide, $R^{15}$ in the general formula (8) is more preferably a hydrogen atom, a fluorine atom, a methyl group, or an ethyl group, and is particularly preferably a hydrogen atom.

In addition, $R^a$s in the above-described general formula (10), which may be selected as Q in the above-described general formula (9), are each independently any one of alkyl groups having 1 to 10 carbon atoms, a phenyl group, and a tolyl group. Such an $R^a$ is preferably a methyl group, an ethyl group, a propyl group, an isopropyl group, a phenyl group, or a tolyl group, more preferably a methyl group or an ethyl group, and further preferably a methyl group.

In addition, y in the above-described general formula (10) represents an integer of 1 to 15 (more preferably 3 to 12, and further preferably 5 to 10).

Note that preferred examples of aromatic diamines of which $R^{10}$ in the above-described general formula (2) is a group represented by formula (9), and of which Q in formula (9) is a group represented by the above-described general formula (10) include compounds (silicone-based aromatic diamines) represented by, for example, the following formula (11):

[Chem 8]

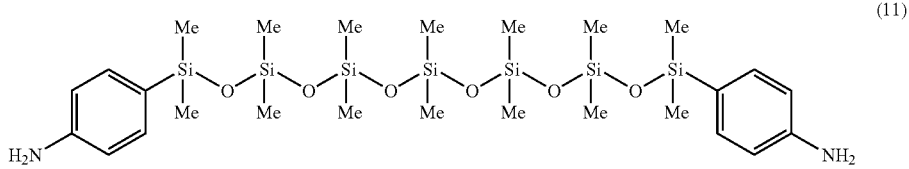

(11)

[in the formula (11), Me represents a methyl group], and the like. As the silicone-based aromatic diamine compounds, for example, siloxanes that are amino-modified at both terminals and the like can be used preferably. Specific examples of the siloxanes that are amino-modified at both terminals include amino-modified silicone oils manufactured by Shin-Etsu Chemical Co., Ltd. (for example, PAM-E, KF-8010, X-22-161A, X-22-161B, KF-8012, KF-8008, X-22-1660B-3, X-22-9409, and the like), dimethylsiloxane-type diamines manufactured by Gelest (for example, DMS-A11, DMS-A12, DMS-A15, DMS-A21, DMS-A31, DMS-A32, DMS-A32R, DMS-A35, and the like), and the like.

In addition, Q in the above-described general formula (9) is preferably a group represented by the formula: —CONH—, —O—$C_6H_4$—O—, —O—, —C(CH$_3$)$_2$—, —CH$_2$—, —O—$C_6H_4$—$C_6H_4$—O—, or —O—$C_6H_4$—C(CH$_3$)$_2$—$C_6H_4$—O—, or a 9,9'-fluorenylidene group, particularly preferably a group represented by the formula: —CONH—, —O—$C_6H_4$—O—, —O—$C_6H_4$—$C_6H_4$—O—, or —O—, and most preferably a group represented by the formula: —CONH—, —O—$C_6H_4$—O—, or —O—. Moreover, Q in the above-described general formula (9) is preferably a group represented by the above-described general formula (10), and is preferably the group represented by the formula: —CONH—.

In addition, examples of the aromatic diamine represented by general formula (2) include 4,4'-diaminodiphenylmethane, 3,3'-diaminodiphenylmethane, 4,4'-diaminodiphenylethane, 3,3'-diaminodiphenylethane, 4,4'-diaminobiphenyl, 3,3'-diaminobiphenyl, 4,4'-diaminodiphenyl ether, 3,3'-diaminodiphenyl ether, 2,2-bis(4-aminophenoxyphenyl)propane, 1,3-bis(4-aminophenoxy)benzene, 1,3-bis(3-aminophenoxy)benzene, bis[4-(4-aminophenoxy)phenyl] sulfone, bis[4-(3-aminophenoxy)phenyl] sulfone, 2,2'-bis(trifluoromethyl)-4,4'-diaminobiphenyl {also referred to as 2,2'-bis(trifluoromethyl)benzidine}, 3,4'-diaminodiphenyl ether, 4,4'-diaminobenzophenone, 3,3'-diaminobenzophenone, 9,9-bis(4-aminophenyl)fluorene, p-diaminobenzene, m-diaminobenzene, o-diaminobenzene, 4,4'-diaminobiphenyl, 4,4'-diamino-2,2'-dimethylbiphenyl, 4,4'-diamino-3,3'-dimethylbiphenyl, 3,3'-diaminobiphenyl, 2,2'-diaminobiphenyl, 3,4'-diaminobiphenyl, 2,6-diaminonaphthalene, 1,4-diaminonaphthalene, 1,5-diaminonaphthalene, 4,4'-[1,3-phenylenebis(1-methyl-ethylidene)]bisaniline, 4,4'-[1,4-phenylenebis(1-methyl-ethylidene)]bisaniline, 2,2'-dimethyl-4,4'-diaminobiphenyl, 3,3'-dimethyl-4,4'-diaminobiphenyl, 3,3'-diaminodiphenyl sulfone, 4,4'-diaminodiphenyl sulfone, 4,4'-diaminodiphenyl sulfide, 1,4-bis(4-aminophenoxy)benzene, 4,4'-bis(4-aminophenoxy)biphenyl, 4,4'-diaminobenzanilide, 3,4'-diaminobenzanilide, 9,9'-bis(4-aminophenyl)fluorene, o-tolidine sulfone, 2,3,5,6-tetramethyl-1,4-phenylenediamine, 3,3',5,5'-tetramethylbenzidine, 1,5-bis(4-aminophenoxy)pentane, 2,2-bis(4-aminophenoxyphenyl)hexafluoropropane, 2,2-bis(3-amino-4-hydroxyphenyl)-hexafluoropropane, 2,2-bis(3-amino-4-methylphenyl)-hexafluoropropane, 2,2-bis(4-aminophenyl)-hexafluoropropane, and the like. Note that, of these aromatic diamines, preferred are 4,4'-diaminobenzanilide, p-diaminobenzene, 2,2'-dimethyl-4,4'-diaminobiphenyl, 3,3'-dimethyl-4,4'-diaminobiphenyl, 4,4'-bis(4-aminophenoxy)biphenyl, 9,9'-bis(4-aminophenyl)fluorene, 2,2'-bis(trifluoromethyl)-4,4'-diaminobiphenyl, 2,2-bis(4-aminophenoxyphenyl)hexafluoropropane, and 4,4'-diaminodiphenyl ether, more preferred are 4,4'-diaminobenzanilide, p-diaminobenzene, and 4,4'-bis(4-aminophenoxy)biphenyl, and further preferred are 4,4'-diaminobenzanilide and p-diaminobenzene. In addition, one of such aromatic diamines may be used alone, or two or more thereof may be used in combination.

In addition, the raw material mixture liquid according to the present invention contains the solvent, the tetracarboxylic dianhydride represented by the above-described general formula (1), and the aromatic diamine represented by the above-described general formula (2), and has a total content of the tetracarboxylic dianhydride and the aromatic diamine (% by mass in the mixture liquid) of 15% by mass or less. Suppose a case where the total content of the tetracarboxylic dianhydride and the aromatic diamine exceeds the upper limit. In such a case, when the polyamic acid solution is prepared by allowing the reaction of the tetracarboxylic dianhydride and the aromatic diamine to proceed in the raw material mixture liquid, the viscosity of the solution is so high that a polyamic acid solution having a viscosity of 5 to 150 cps cannot be obtained. In addition, from the viewpoint of more efficiently obtaining the polyamic acid solution having a viscosity of 5 to 150 cps, the total content of the tetracarboxylic dianhydride and the aromatic diamine is preferably 3 to 15% by mass, and more preferably 5 to 12% by mass. Note that if the total content of the tetracarboxylic dianhydride and the aromatic diamine is less than the lower limit, the solvent tends to be required in a large amount, and physical properties of the polyimide film tend to deteriorate.

In addition, the content ratio between the tetracarboxylic dianhydride and the aromatic diamine in the raw material mixture liquid is preferably 0.75:1.5 to 1.5:0.75, and more preferably 0.9:1.1 to 1.1:0.9 in terms of the mole ratio ([the tetracarboxylic dianhydride]:[the aromatic diamine]).

In addition, the ratio between the tetracarboxylic dianhydride and the aromatic diamine used in the raw material mixture liquid is not particularly limited, but is preferably such that the acid anhydride groups of the tetracarboxylic dianhydride are 0.5 to 2 equivalents relative to 1 equivalent of the amino groups of the aromatic diamine, and more preferably such that the acid anhydride groups are 0.7 to 1.2 equivalents.

Note that the raw material mixture liquid may contain another dianhydride together with the tetracarboxylic dianhydride represented by the above-described general formula (1) according to the design of the target polyimide film, unless any effect of the present invention is impaired.

Examples of the other dianhydride than the tetracarboxylic dianhydride represented by the above-described general formula (1) include aliphatic or alicyclic tetracarboxylic dianhydrides such as 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrfural)-3-methyl-3-cyclohexene-1,2-dicarboxylic dianhydride, bicyclo[2.2.2]-oct-7-ene-2,3,5,6-tetracarboxylic dianhydride, bicyclo[2.2.1]heptane-2,3,5,6-tetracarboxylic dianhydride, (4H,8H)-decahydro-1,4:5,8-dimethanonaphthalene-2,3,6,7-tetracarboxylic dianhydride (also referred to as tetracyclo[4.4.0.1$^{2,5}$.1$^{7,10}$]dodeca-3,4,8,9-tetracarboxylic dianhydride), pentacyclo[9.2.1.1$^{4,7}$.0$^{2,10}$.0$^{3,8}$]-pentadecane-5,6,12,13-tetracarboxylic dianhydride, and hexacyclo[6.6.1.1$^{3,6}$.1$^{10,13}$.0$^{2,7}$.0$^{9,14}$]heptadeca-4,5,11,13-tetracarboxylic dianhydride; aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 4,4'-(2,2-hexafluoroisopropylidene)diphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, and bis(triphenylphthalic acid)-4,4'-diphenylmethane dianhydride; and the like. Note that, when the other dianhydride is used, the obtained polyimide comprises another repeating unit together with the repeating unit represented by the above-described general formula (5). In addition, when an aromatic tetracarboxylic dianhydride is used as the other dianhydride, the amount of the other dianhydride used is preferably changed, as appropriate, within a range where the obtained polyimide can have a sufficient transparency.

In addition, in the first step, the polyamic acid having a repeating unit represented by the above-described general formula (3) is formed by reacting the tetracarboxylic dianhydride and the aromatic diamine with each other in the raw material mixture liquid.

The reaction temperature at which the tetracarboxylic dianhydride and the aromatic diamine are reacted with each other as described above is not particularly limited, as long as the temperature is adjusted, as appropriate, to a temperature at which these compounds can be reacted with each other, and is preferably 0 to 50° C., more preferably 10 to 40° C., and further preferably 20 to 30° C.

In addition, a method for reacting the tetracarboxylic dianhydride and the aromatic diamine with each other is not particularly limited, and a method which enables a polymerization reaction of the tetracarboxylic dianhydride and the aromatic diamine can be used, as appropriate. For example, a method may be employed in which after the aromatic diamine is dissolved in the solvent under conditions of an atmospheric pressure and an inert atmosphere of nitrogen, helium, argon, or the like, the tetracarboxylic dianhydride is added, and then the reaction is allowed to proceed at the above-described reaction temperature for 0.5 to 24 hours (more preferably 1 to 15 hours, and further preferably 2 to 10 hours).

In addition, when the tetracarboxylic dianhydride and the aromatic diamine are reacted with each other, it is preferable to stir the raw material mixture liquid from the viewpoint of, for example, allowing the reaction to proceed efficiently. A method for the stirring is not particularly limited, and a known method (for example, a method using a known stirring apparatus or the like) can be used, as appropriate.

When the tetracarboxylic dianhydride and the aromatic diamine are reacted with each other in the raw material mixture liquid as described above, it is preferable to react the tetracarboxylic dianhydride and the aromatic diamine with each other in the raw material mixture liquid by stirring the raw material mixture liquid under a temperature condition of 0 to 50° C. (more preferably 10 to 40° C., and further preferably 20 to 30° C.) for 0.5 to 24 hours (more preferably 1 to 15 hours, and further preferably 2 to 10 hours) from the viewpoint of, for example, sufficiently forming the polyamic acid in the raw material mixture liquid.

The polyamic acid having a repeating unit represented by the above-described general formula (3) can be formed by reacting the tetracarboxylic dianhydride and the aromatic diamine with each other as described above. Note that $R^1$, $R^2$, $R^3$, and n in the above-described general formula (3) are the same as $R^1$, $R^2$, $R^3$, and n in the general formula (1), respectively (have the same meanings as those of $R^1$, $R^2$, $R^3$, and n in the general formula (1), respectively), and preferred examples thereof are also the same as those of $R^1$, $R^2$, and $R^3$, and n in the above-described general formula (1). In addition, $R^{10}$ in the above-described general formula (3) is the same as $R^{10}$ in the above-described general formula (2) (has the same meaning as that of $R^{10}$ in the general formula (2)), and preferred examples thereof are also the same as those of $R^{10}$ in the above-described general formula (2). Note that the polyamic acid is preferably one mainly containing a repeating unit represented by the above-described general formula (3) (more preferably, the content of the repeating unit represented by the above-described general formula (3) is 90 to 100% by mole relative to all the repeating units).

In addition, in the present invention, the polyamic acid solution having a viscosity of 5 to 150 cps (centipoise) is obtained by reacting the tetracarboxylic dianhydride and the aromatic diamine with each other in the raw material mixture liquid to form the polyamic acid in the raw material mixture liquid. In addition, the viscosity of the polyamic acid solution is more preferably 10 to 100 cps, and particularly preferably 20 to 50 cps.

Note that when the polyamic acid solution having a viscosity of 5 to 150 cps (centipoise) has to be stored after its formation as described above, the polyamic acid solution is preferably stored at a low storage temperature from the viewpoint of keeping the viscosity at 5 to 150 cps by suppressing the increase in molecular weight of the polyamic acid in the polyamic acid solution during the storage. The storage temperature of the polyamic acid solution is desirably −80° C. to −1° C., further desirably −40° C.

to −5° C., and particularly preferably −20° C. to −10° C. The storage period of the polyamic acid solution at the storage temperature cannot be generally specified because it depends on the storage temperature employed; however, the storage period is desirably 1 day to two years, further desirably 1 week to 1 year, and particularly preferably 1 month to half a year. Note that the storage period is preferably short considering the labor for the storage, the economic efficiency, and the like. In addition, also when the raw material mixture liquid has to be stored after preparation but before the formation of the polyamic acid solution, the raw material mixture liquid is preferably stored by employing the above-described storage temperature condition and the above-described storage period condition of the polyamic acid solution.

In the present invention, the viscosity of the polyamic acid solution can be determined as follows. Specifically, the viscosity of the polyamic acid solution is measured by using, as a viscosity-measuring device, an RE-85 L model viscometer manufactured by TOKI SANGYO CO., LTD equipped with a 1°34'×R24 standard cone rotor as a cone rotor. In addition, for the measurement of the viscosity of the polyamic acid solution, the viscosity-measuring device (the viscometer) is calibrated before the measurement under a temperature condition of 25° C. by using a viscometer calibration standard solution JS20 (a viscometer calibration standard solution according to JIS Z8809 (issued in 2011)) manufactured by NIPPON GREASE Co., Ltd. Then, by using the calibrated viscosity-measuring device (viscometer), the viscosity of the polyamic acid solution is measured under a temperature condition of 25° C. and a condition where the rotation speed of the cone rotor is in the range from 0.5 to 100 rpm. As the viscosity of the polyamic acid solution, a value measured by employing the measuring method as described above is employed. The method for measuring the viscosity employs the method according to JIS Z8803 (issued in 2011). Note that the method for measuring the viscosity is a method preferably used for measuring a solution having a low viscosity (a viscosity of 1215 cps or lower). Hence, if the viscosity to be checked is that of a solution having a high-viscosity (for example, 352.3 to 70460 cps) which is out of the range (5 to 150 cps) of the viscosity of the polyamic acid solution according to the present invention, the type of the cone rotor and the type of the viscometer calibration standard solution may be changed.

In addition, the polyamic acid solution obtained in the first step is such that the content (concentration) of the polyamic acid in the solution is preferably 15% by mass or less, more preferably 3 to 15% by mass, and further preferably 5 to 12% by mass. Note that the concentration of the polyamic acid solution (the content of the polyamic acid in the solution) can be easily achieved by adjusting the total content (% by mass in the mixture liquid) of the tetracarboxylic dianhydride and the aromatic diamine in the raw material solution within the above-described range.

<Step of Obtaining Polyimide-Forming Mixture Liquid (Second Step)>

The step of obtaining a polyimide-forming mixture liquid according to the present invention is a step (second step) of obtaining a polyimide-forming mixture liquid by adding a compound represented by the above-described general formula (4) to the polyamic acid solution. Note that, for convenience, the compound represented by the above-described general formula (4) may be simply referred to as "imidazole-based compound" in some cases below.

First, the compound (imidazole-based compound) represented by the general formula (4) used in the second step is described below (note that, in the above-described general formula (4), $R^{11}$ represents one selected from the group consisting of a hydrogen atom and alkyl groups, $R^{12}$ represents an optionally substituted aromatic group, $R^{13}$ represents an optionally substituted alkylene group, $R^{14}$s each independently represent one selected from the group consisting of halogen atoms, a hydroxy group, a mercapto group, a sulfide group, a silyl group, a silanol group, a nitro group, a nitroso group, a sulfonato group, a phosphino group, a phosphinyl group, a phosphonato group, and organic group, and m represents an integer of 0 to 3).

Regarding the imidazole-based compound used in the second step, $R^{11}$ in the above-described general formula (4) is a hydrogen atom or an alkyl group as described above. When $R^{11}$ in the general formula (4) is an alkyl group, the alkyl group may be a linear alkyl group, or a branched chain alkyl group. In addition, the number of carbon atoms of the alkyl group which may be selected as $R^{11}$ is not particularly limited, and is preferably 1 to 20, preferably 1 to 10, and more preferably 1 to 5.

Specific examples of alkyl groups preferable as $R^{11}$ in the above-described general formula (4) include a methyl group, an ethyl group, a n-propyl group, an isopropyl group, a n-butyl group, an isobutyl group, a sec-butyl group, a tert-butyl group, a n-pentyl group, an isopentyl group, a tert-pentyl group, a n-hexyl group, a n-heptyl group, a n-octyl group, a 2-ethyl-n-hexyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group.

Among these, $R^{11}$ is preferably a methyl group or an ethyl group, and is more preferably a methyl group.

$R^{12}$ in the above-described general formula (4) is an optionally substituted aromatic group. Note that the optionally substituted aromatic group may be an optionally substituted aromatic hydrocarbon group, or even may be an optionally substituted aromatic heterocyclic group.

The type of the aromatic hydrocarbon group which can be used as the aromatic group is not particularly limited, unless an effect (the effect as an agent for promoting the increase in molecular weight, the effect as an agent for promoting the imidization, or the like) of the imidazole-based compound is impaired. Such an aromatic hydrocarbon group may be a monocyclic aromatic group, one formed by condensation of two or more aromatic hydrocarbon groups, or one formed by bonding two or more aromatic hydrocarbon groups to each other through a single bond. The aromatic hydrocarbon group is preferably a phenyl group, a naphthyl group, a biphenylyl group, an anthryl group, or a phenanthrenyl group. In addition, the type of the aromatic heterocyclic group which can be used as the aromatic group is not particularly limited, unless an effect of the imidazole-based compound is impaired. Such an aromatic heterocyclic group may be a monocyclic group or a polycyclic group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, or a benzoimidazolyl group.

Substituents which may be present on these aromatic groups (the aromatic hydrocarbon groups (phenyl groups, polycyclic aromatic hydrocarbon groups, and the like) and the above-described aromatic heterocyclic groups, and the like) include halogen atoms, hydroxy groups, mercapto groups, sulfide groups, silyl groups, silanol groups, nitro groups, nitroso groups, sulfino groups, sulfo groups, sulfonato groups, phosphino groups, phosphinyl groups, phosphono groups, phosphonato groups, amino groups, ammonio groups, and organic groups. When such an aromatic group has multiple substituents, the multiple substituents may be the same or different.

When a substituent present on the aromatic group is an organic group, examples of the organic group include an alkyl group, an alkenyl group, a cycloalkyl group, a cycloalkenyl group, an aryl group, an aralkyl group, and the like. Such an organic group may contain a linkage or substituent other than a hydrocarbon group, such as a heteroatom, in the organic group. In addition, the organic group may be any one of linear, branched, and cyclic. The organic group is monovalent in general, but in a case where a cyclic structure is formed or other cases, the organic group may be divalent or higher valent.

When the aromatic group has substituents on adjacent carbon atoms, the two substituents bonded onto the adjacent carbon atoms may be bonded to each other to form a cyclic structure. Examples of such a cyclic structure include aliphatic hydrocarbon rings and heteroatom-containing aliphatic rings.

When a substituent of the aromatic group is an organic group, a linkage contained in the organic group is not particularly limited, unless an effect of the imidazole-based compound is impaired. Such an organic group may contain a linkage containing a heteroatom, such as an oxygen atom, a nitrogen atom, or a silicon atom. Specific examples of such a heteroatom-containing linkage include an ether linkage, a thioether linkage, a carbonyl linkage, a thiocarbonyl linkage, an ester linkage, an amide linkage, a urethane linkage, an imino linkage (—N=C(—R)—, —C(=NR)—: R represents a hydrogen atom or an organic group), a carbonate linkage, a sulfonyl linkage, a sulfinyl linkage, an azo linkage, and the like.

In addition, when a substituent of the aromatic group is an organic group, and the organic group has a heteroatom-containing linkage, the heteroatom-containing linkage which may be present on the organic group is preferably an ether linkage, a thioether linkage, a carbonyl linkage, a thiocarbonyl linkage, an ester linkage, an amide linkage, an amino linkage (—NR—: R represents a hydrogen atom or a monovalent organic group), a urethane linkage, an imino linkage (—N=C(—R)—, —C(=NR)—: R represents a hydrogen atom or a monovalent organic group), a carbonate linkage, a sulfonyl linkage, or a sulfinyl linkage, from the viewpoint of the heat resistance of the compound represented by the above-described general formula (4).

When a substituent present on the aromatic group is the above-described organic group, and the organic group is a substituent other than a hydrocarbon group, the type of the substituent other than a hydrocarbon group is not particularly limited, as long as an effect of the imidazole-based compound is impaired. Specific examples of such a substituent other than a hydrocarbon group include halogen atoms, a hydroxy group, a mercapto group, a sulfide group, a cyano group, an isocyano group, a cyanato group, an isocyanato group, a thiocyanato group, an isothiocyanato group, silyl groups, silanol groups, alkoxy groups, alkoxycarbonyl groups, an amino group, monoalkoxyamino groups, dialkylaluminum groups, monoarylamino groups, diarylamino groups, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phospho-nato group, alkyl ether groups, alkenyl ether groups, alkyl thioether groups, alkenyl thioether groups, aryl ether groups, aryl thioether groups, and the like. A hydrogen atom contained in the above-described substituent may be substituted with a hydrocarbon group. In addition, the hydrocarbon group contained in the above-described substituent may be any one of linear, branched, and cyclic.

A substituent of the aromatic group (for example, a phenyl group, a polycyclic aromatic hydrocarbon group, or an aromatic heterocyclic group) is preferably an alkyl group having 1 to 12 carbon atoms, an aryl group having 1 to 12 carbon atoms, an alkoxy group having 1 to 12 carbon atoms, an aryloxy group having 1 to 12 carbon atoms, an arylamino group having 1 to 12 carbon atoms, or a halogen atom.

$R^{12}$ in the above-described general formula (4) is preferably an optionally substituted phenyl group, an optionally substituted furyl group, or an optionally substituted thienyl group, from the viewpoints that the compound (imidazole-based compound) represented by the above-described general formula (4) can be easily synthesized at low costs and that the imidazole-based compound has good solubility in water and organic solvents.

$R^{13}$ in the above-described general formula (4) is an optionally substituted alkylene group. A substituent which may be present on the alkylene group is not particularly limited, unless an effect of the imidazole-based compound is impaired. Specific examples of the substituent which may be present on the alkylene group include a hydroxy group, alkoxy groups, amino groups, a cyano group, halogen atoms, and the like. The alkylene group may be a linear alkylene group or a branched alkylene group, and is preferably a linear alkylene group. The number of carbon atoms of the alkylene group is not particularly limited, and is preferably 1 to 20, preferably 1 to 10, and more preferably 1 to 5. Note that the number of carbon atoms in the alkylene group does not include carbon atoms of substituents bonded to the alkylene group.

Such an alkoxy group serving as a substituent bonded to the alkylene group may be a linear alkoxy group or a branched alkoxy group. The number of carbon atoms in the alkoxy group serving as a substituent bonded to the alkylene group is not particularly limited, and is preferably 1 to 10, more preferably 1 to 6, and particularly preferably 1 to 3.

In addition, the amino group serving as a substituent bonded to the alkylene group may be a monoalkoxyamino group or a dialkylamino group. The alkyl group(s) contained in the monoalkoxyamino group or the dialkylamino group may be a linear alkyl group or a branched alkyl group. The number of carbon atoms of the alkyl group contained in the monoalkoxyamino group or the dialkylamino group is not particularly limited, and is preferably 1 to 10, more preferably 1 to 6, and particularly preferably 1 to 3.

In addition, specific examples of the alkylene groups preferable as $R^{13}$ in the above-described general formula (4) include a methylene group, an ethane-1,2-diyl group, a n-propane-1,3-diyl group, a n-propane-2,2-diyl group, a n-butane-1,4-diyl group, a n-pentane-1,5-diyl group, a n-hexane-1,6-diyl group, a n-heptane-1,7-diyl group, a n-octane-1,8-diyl group, a n-nonane-1,9-diyl group, a n-decane-1,10-diyl group, a n-undecane-1,11-diyl group, a n-dodecane-1,12-diyl group, a n-tridecane-1,13-diyl group, a n-tetradecene-1,14-diyl group, a n-pentadecane-1,15-diyl group, a n-hexadecane-1,16-diyl group, a n-heptadecane-1,17-diyl group, a n-octadecane-1,18-diyl group, a n-nonadecane-1,19-diyl group, and a n-icosane-1,20-diyl group.

In the above-described general formula (4), $R^{14}$ is a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and m is an integer of 0 to 3. When m is an integer of 2 or 3, multiple $R^{14}$s may be the same or different from each other.

When $R^{14}$ in the above-described general formula (4) is an organic group, the organic group is the same as the organic group described as a substituent of the aromatic group for $R^{12}$ in the formula (4).

When $R^{14}$ in the above-described general formula (4) is an organic group, the organic group is preferably an alkyl group, an aromatic hydrocarbon group, or an aromatic heterocyclic group. When $R^{14}$ is an alkyl group, the alkyl group is preferably a linear or branched alkyl group having 1 to 8 carbon atoms, and more preferably a methyl group, an ethyl group, a n-propyl group, or an isopropyl group. Meanwhile, when $R^{14}$ is an aromatic hydrocarbon group, the aromatic hydrocarbon group is preferably a phenyl group, a naphthyl group, a biphenylyl group, an anthryl group, or a phenanthrenyl group, more preferably a phenyl group or a naphthyl group, and particularly preferably a phenyl group. Further, when $R^{14}$ is an aromatic heterocyclic group, the aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, or a benzoimidazolyl group, and more preferably a furyl group or a thienyl group.

When $R^{14}$ in the above-described general formula (4) is an alkyl group, the position on the imidazole ring at which the alkyl group is bonded is preferably any one of positions 2, 4, and 5, and is more preferably position 2. When $R^{14}$ in the above-described general formula (4) is an aromatic hydrocarbon group or an aromatic heterocyclic group, the position on the imidazole at which these groups are bonded is preferably position 2.

Moreover, m in the above-described general formula (4) is an integer of 0 to 3. The value of m is more preferably an integer of 0 to 2.

Of these compounds (imidazole-based compounds) represented by the general formula (4), preferred are compounds represented by the following general formula (4-1):

[Chem 9]

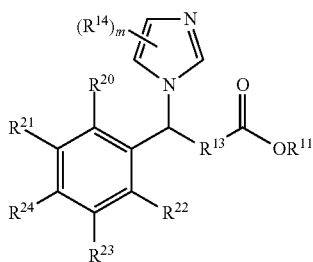

(4-1)

(in the formula (4-1), $R^{11}$, $R^{13}$, $R^{14}$, and m are the same as $R^{11}$, $R^{13}$, $R^{14}$, and m in the above-described general formula (4), respectively, $R^{20}$, $R^{21}$, $R^{22}$, $R^{23}$, and $R^{24}$ are each independently a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of $R^{20}$, $R^{21}$, $R^{22}$, $R^{23}$, and $R^{24}$ is a group other than a hydrogen atom), and more preferred are compounds represented by the above-described general formula (4-1) in which $R^{13}$ is a methylene group.

When $R^{20}$, $R^{21}$, $R^{22}$, $R^{23}$, and $R^{24}$ in the above-described general formula (4-1) are organic groups, the organic groups are the same as the organic group present as a substituent on $R^{12}$ in the above-described general formula (4). $R^{20}$, $R^{21}$, $R^{22}$, $R^{23}$, and $R^{24}$ in the above-described general formula (4-1) are preferably hydrogen atoms.

In the compound represented by the above-described general formula (4-1), it is preferable that at least one of $R^{20}$, $R^{21}$, $R^{22}$, $R^{23}$, and $R^{24}$ in the formula be a substituent represented by the formula: —O—$R^{30}$ (where $R^{30}$ is a hydrogen atom or an organic group) (the substituent represented by the formula: —O—$R^{30}$ is hereinafter simply referred to as "substituent (A)" in some cases), and it is particularly preferable that $R^{24}$ be the substituent (A). In addition, in the compound represented by the above-described general formula (4-1) in which $R^{24}$ is the substituent (A), $R^{20}$, $R^{21}$, $R^{22}$, and $R^{23}$ are preferably hydrogen atoms.

When $R^{30}$ in the substituent (A) is an organic group, the organic group is the same as the organic group described as a substituent on the aromatic group for $R^{12}$ in the above-described general formula (4). $R^{30}$ in the substituent (A) is preferably an alkyl group, more preferably an alkyl group having 1 to 8 carbon atoms, particularly preferably an alkyl group having 1 to 3 carbon atoms, and most preferably a methyl group.

Of these compounds represented by the general formula (4-1), preferred are compounds represented by the following general formula (4-1-1):

[Chem 10]

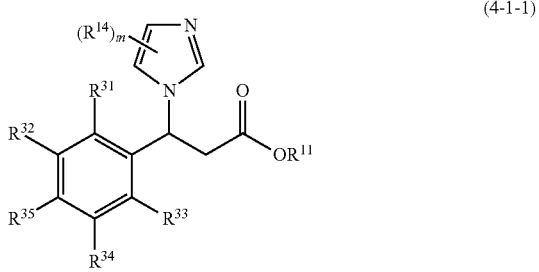

(4-1-1)

(in the formula (4-1-1), $R^{11}$, $R^{14}$, and m are the same as $R^{11}$, $R^{14}$, and m in the above-described general formula (4), respectively, and $R^{31}$, $R^{32}$, $R^{33}$, $R^{34}$, and $R^{35}$ are each independently a hydrogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of $R^{31}$, $R^{32}$, $R^{33}$, $R^{34}$, and $R^{35}$ is a group other than hydrogen atom).

In the compound represented by the above-described general formula (4-1-1), it is preferable that at least one of $R^{31}$, $R^{32}$, $R^{33}$, $R^{34}$, and $R^{35}$ be the substituent (A) (the group represented by the formula: —O—$R^{30}$), and it is particularly preferable that $R^{35}$ be the substituent (A). In addition, when $R^{35}$ is the substituent (A) (the group represented by the formula: —O—$R^{30}$), $R^{31}$, $R^{32}$, $R^{33}$, and $R^{34}$ are preferably hydrogen atoms.

A method for synthesizing the imidazole-based compound represented by the above-described general formula (4) is not particularly limited. The compound (imidazole-based compound) represented by the above-described general formula (4) can be synthesized by, for example, reacting a halogen-containing carboxylic acid derivative represented by the following general formula (I) with an imidazole-based compound represented by the following general formula (II) in a usual manner to perform imidazolylation:

[Chem 11]

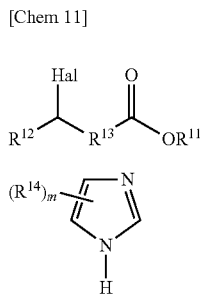

(I)

(II)

(in the formulae (I) and (II), $R^{11}$, $R^{12}$, $R^{13}$, $R^{14}$, and m are the same as $R^{11}$, $R^{12}$, $R^{13}$, $R^{14}$, and m in the above-described general formula (4), respectively. Note that Hal in the formula (I) represents a halogen atom).

In addition, when the compound (imidazole-based compound) represented by the above-described general formula (4) is a compound represented by the above-described general formula (4) where $R^{13}$ is a methylene group, i.e., when the imidazole-based compound is a compound represented by the following general formula (4-2):

[Chem 12]

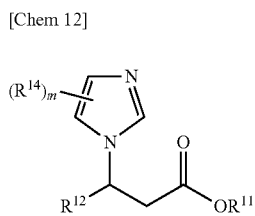

(4-2)

(in the formula (4-2), $R^{11}$, $R^{12}$, $R^{14}$, and m are the same as $R^1$, $R^{12}$, $R^{14}$, and m in the above-described general formula (4), respectively), the imidazole-based compound can be synthesized by a method based on the Michael addition reaction described below.

Specifically, for example, the Michael addition reaction is caused by mixing a 3-substituted acrylic acid derivative represented by the following general formula (III):

[Chem 13]

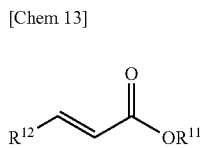

(III)

(in the formula (III), $R^{11}$ and $R^{12}$ are the same as $R^{11}$ and $R^{12}$ in the above-described general formula (4), respectively) with an imidazole-based compound represented by the above-described general formula (II) in a solvent. Thus, the imidazole-based compound represented by the above-described general formula (4-2) can be obtained.

In addition, an imidazole-based compound represented by the following general formula (4-3) can be obtained by adding an imidazolyl group-containing 3-substituted acrylic acid derivative represented by the following general formula (IV) to a water-containing solvent:

[Chem 14]

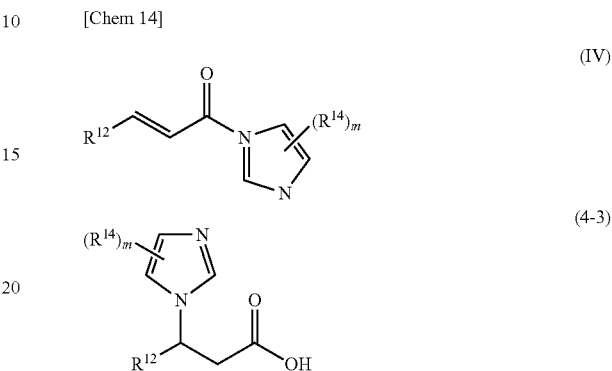

(IV)

(4-3)

(in the formulae (IV) and (4-3), $R^{12}$, $R^{14}$, and m are the same as $R^{12}$, $R^{14}$, and m in the above-described general formula (4), respectively).

In this case, hydrolysis of the 3-substituted acrylic acid derivative represented by the above-described general formula (IV) results in the formation of the imidazole-based compound represented by the above-described general formula (II) and a 3-substituted acrylic acid represented by the following general formula (V):

[Chem 15]

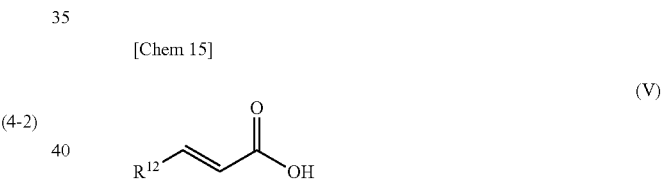

(V)

(in the formula (V), $R^{12}$ is the same as $R^{12}$ in the above-described general formula (4)). Then, the Michael addition reaction occurs between the 3-substituted acrylic acid represented by the above-described general formula (V) and the imidazole-based compound represented by the above-described general formula (II) to form the imidazole-based compound represented by the above-described general formula (4-3).

Note that specific preferred examples of the imidazole-based compound represented by the above-described general formula (4) include the following:

[Chem 16]

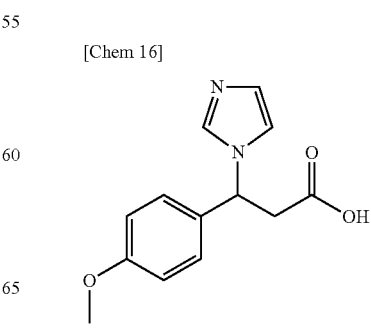

-continued

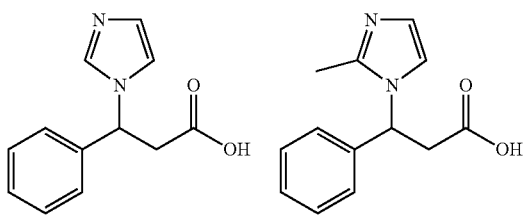
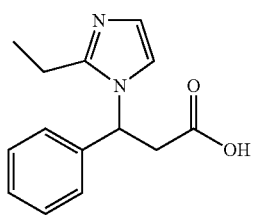
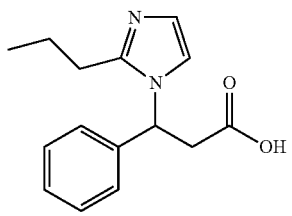
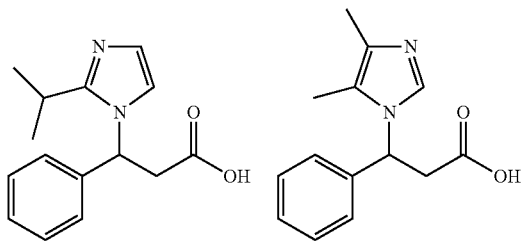
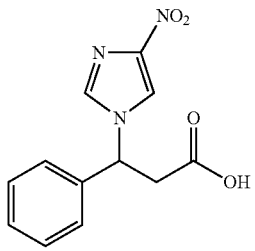
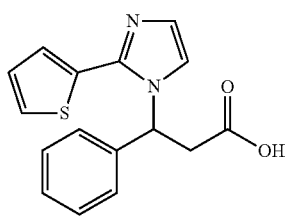
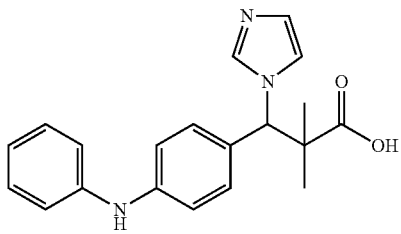

-continued

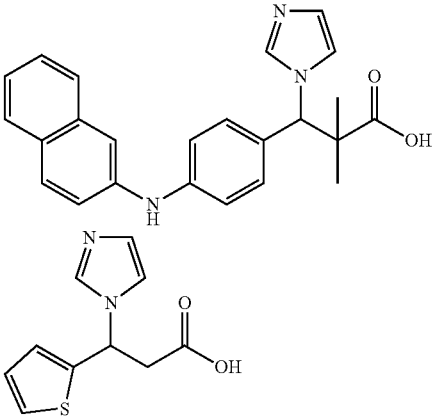

Hereinabove, the compound (imidazole-based compound) represented by the general formula (4) used in the second step is described. In the second step, a polyimide-forming mixture liquid is prepared by adding the imidazole-based compound to the above-described polyamic acid solution.

The amount of the compound (imidazole-based compound) represented by the general formula (4) added is preferably such an amount that the total content of the imidazole-based compound and the polyamic acid in the obtained polyimide-forming mixture liquid can be 20% by mass or less (more preferably 15% by mass or less, and further preferably 12 to 5% by mass).

In addition, the amount of the compound (imidazole-based compound) represented by the general formula (4) added is preferably 1 to 60 parts by mass, and more preferably 10 to 40 parts by mass relative to 100 parts by mass of the polyamic acid.

In addition, a method for adding the compound (imidazole-based compound) represented by the general formula (4) to the polyamic acid solution is not particularly limited, and a method may be employed in which a powder (solid) of the imidazole-based compound is added to the polyamic acid solution, or a method may be employed in which the imidazole-based compound is added to the polyamic acid solution by preparing a solution in which the imidazole-based compound is dissolved in a solvent (which is preferably the same as the solvent used for the polyamic acid solution) in advance, and adding the solution to the polyamic acid solution. As described above, the polyimide film may be formed by using a polyimide-forming mixture liquid which has been formed by separately preparing the polyamic acid solution and the solution in which the imidazole-based compound is dissolved, and then mixing the two liquids with each other, in the present invention.

Note that, in the present invention, the compound (imidazole-based compound) represented by the general formula (4) is added to the solution of a polyamic acid (the polyamic acid solution obtained in the first step) as described above. Hence, the viscosity of the polyimide-forming mixture liquid after the addition and at a stage before the increase in molecular weight and the imidization reaction are allowed to proceed is basically dependent on the viscosity of the polyamic acid solution. Hence, a film (preferably a coating film) can be formed with the viscosity of the polyimide-forming mixture liquid (which can be used as a so-called coating liquid) being maintained in a sufficiently low state, so that the workability is sufficiently high, and moreover the surface smoothness of the film can be improved more efficiently during film formation.

If it is necessary to store the polyimide-forming mixture liquid (the polyamic acid solution containing the imidazole-based compound) after the solution is formed as described above, the polyamic acid solution is preferably stored at a low storage temperature, from the viewpoint of suppressing the increase in molecular weight of the polyamic acid in the polyimide-forming the mixture liquid during the storage to keep the viscosity of the polyimide-forming mixture liquid at 5 to 150 cps. The storage temperature of the polyimide-forming mixture liquid is desirably −80° C. to −10° C., further desirably −40° C. to −15° C., and particularly preferably −20° C. In addition, the storage period of the polyimide-forming mixture liquid cannot be generally specified, because it depends on the storage temperature; however, the storage period is desirably 0.5 days to 1 year, further desirably 1 day to half a year, and particularly preferably 1 week to 3 months.

Moreover, the polyimide-forming mixture liquid preferably further comprises an adhesion improvement agent to a substrate (an inorganic substrate of glass, metal, metal oxide, or the like) which is to be coated with the polyimide-forming mixture liquid. In other words, the polyimide-forming mixture liquid is preferably a composition further comprising the adhesion improvement agent. For example, when the polyimide film is subjected to a laser detachment process after formation to detach the film from a glass substrate (when the so-called laser lift-off method is used), the addition of the adhesion improvement agent allows the polyimide film to exhibit sufficiently high adhesion to the glass substrate at a stage before the laser detachment process. Hence, in a case where the film is subjected to processing or the like (a process for stacking another layer or the like) in a state before the laser detachment process for use in various applications or other similar cases, occurrence of breakage due to peeling of the film from the substrate can be sufficiently suppressed. On the other hand, even when the adhesion to a glass substrate is improved by the adhesion improvement agent, the obtained polyimide film can be detached efficiently from the glass substrate by the so-called laser lift-off method.

The adhesion improvement agent is not particularly limited, as long as the adhesion improvement agent can improve the adhesion to a substrate (an inorganic substrate of glass, metal, metal oxide, or the like) which is to be coated with the polyimide-forming mixture liquid. The adhesion improvement agent is preferably a silane coupling agent, a siloxane resin, or a polysilane, more preferably a silane coupling agent or a siloxane resin, and particularly preferably a silane coupling agent. As the adhesion improvement agent, a commercially available product can be used, as appropriate, although the adhesion improvement agent is not particularly limited thereto.

In addition, examples of the silane coupling agent include, but are not particularly limited to, methyltrimethoxysilane, methyltriethoxysilane, ethyltrimethoxysilane, ethyltriethoxysilane, n-propyltrimethoxysilane, n-propyltriethoxysilane, n-butyltrimethoxysilane, n-butyltriethoxysilane, dimethyldimethoxysilane, dimethyldiethoxysilane, phenyltrimethoxysilane, phenyltriethoxysilane, diphenyldimethoxysilane, diphenyldiethoxysilane, vinyltrimethoxysilane, vinyltriethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethylmethyldiethoxysilane, [(3-ethyl-3-oxetanyl)methoxy]propyltrimethoxysilane, [(3-ethyl-3-oxetanyl)methoxy]propyltriethoxysilane, 3-mercaptopropyltrimethoxysilane, 3-mercaptopropylmethyldimethoxysilane, 3-ureidopropyltriethoxysilane, 3-isocyanatepropyltriethoxysilane, 3-trimethoxysilylpropylsuccinic anhydride, N-t-butyl-3-(3-trimethoxysilylpropyl)succinimide, N-2-(aminoethyl)-3-aminopropylmethyldimethoxysilane, N-2-(aminoethyl)-3-aminopropyltrimethoxysilane, benzaldehyde-type ketimine of 3-aminopropyltriethoxysilane, tris-(trimethoxysilylpropyl)isocyanurate, phthalic anhydride adduct of 3-aminopropyltriethoxysilane, and the like. One of these silane coupling agents may be used alone, or two or more thereof may be used in combination.

In addition, when the polyimide-forming mixture liquid contains the adhesion improvement agent, the content of the adhesion improvement agent is preferably 0.01 to 50 parts by mass, more preferably 0.1 to 10 parts by mass, and further preferably 0.5 to 5 parts by mass, relative to 100 parts by mass of the polyamic acid forming the polyamic acid solution.

<Step of Obtaining Film Made of Polyimide (Third Step)>

The step of obtaining a film made of a polyimide according to the present invention is a step (third step) of obtaining a film made of a polyimide having a repeating unit represented by the above-described general formula (5) by forming a film made of the polyimide-forming mixture liquid, followed by imidization of the polyamic acid in the film.

A method for forming the film made of the polyimide-forming mixture liquid in the third step is not particularly limited, and a known method can be used, as appropriate. An example thereof may be a method in which a base material for supporting the above-described film is used when the film is formed, and the polyimide-forming mixture liquid is applied onto the supporting base material to form a film (a coating film in this case).

The base material onto which the polyimide-forming mixture liquid is to be applied (the base material for supporting the film when the film is formed) is not particularly limited, and a base material made of a known material (for example, a glass plate or a metal plate) which can be used for forming a substrate film made of a polymer can be used, as appropriate, according to the shape of the target substrate film made of a polyimide and the like.

In addition, a method for applying the polyimide-forming mixture liquid onto the base material is not particularly limited, and, for example, a known method such as a spin coating method, a spray coating method, a dip coating method, a dropping method, a gravure printing method, a screen printing method, a relief printing method, a die coating method, a slit coating method, a curtain coating method, or an inkjet method can be employed, as appropriate.

In addition, the thickness of the film of the polyimide-forming mixture liquid formed on the base material is such that the thickness of the film after curing is preferably 0.1 to 200 µm, and more preferably 1 to 100 µm.

Moreover, after the formation of the film of the polyimide-forming mixture liquid, it is preferable to perform a treatment for removing the solvent by heating (a solvent removal treatment). A method for the solvent removal treatment is not particularly limited, and the solvent is preferably removed with the heating temperature being set at 0 to 150° C. (more preferably 20 to 80° C.). In addition, in the method for the solvent removal treatment, the air atmosphere is acceptable as the atmosphere during the heating, but an inert gas atmosphere (for example, a nitrogen atmosphere) is preferable. In addition, from the viewpoint of conducting the drying more efficiently, a pressure condition for the solvent removal treatment is preferably 1 to 760 mmHg. Such a solvent removal treatment enables isolation of the polyamic acid in the form of a film or the like, and it is also possible to perform a heating treatment or the like later.

In addition, a method for the imidization of the polyamic acid in the film (which may be a film after the solvent removal treatment) is not particularly limited, and a known method can be employed, as appropriate. It is preferable to employ a method in which the imidization is conducted by subjecting the film to a heat treatment, because the heating allows increase in molecular weight and the ring-closure dehydration reaction (imidization reaction) of the polyamic acid catalyzed by the compound represented by the above-described general formula (4) to proceed more efficiently. When a method is employed in which the imidization is conducted by subjecting the film to a heat treatment as described above, a temperature condition of the heat treatment is preferably 150 to 450° C. (more preferably 200 to 400° C., further preferably 250 to 380° C., and particularly preferably 280 to 350° C.). In addition, a heating time for which the heat treatment is conducted is preferably 0.1 to 10 hours, and more preferably 0.5 to 5 hours.

In addition, when a method is employed in which the imidization is conducted by subjecting the film to a heat treatment, a condition of atmosphere during the heat treatment is preferably an inert gas atmosphere (for example, a nitrogen atmosphere, a low-acid concentration atmosphere (an atmosphere with an oxygen concentration of 1 to 300 ppm)) from the viewpoint of, for example, suppressing color development and deterioration in physical properties due to oxygen; however, it is also possible to conduct the heat treatment under air, for example, when the temperature is 250° C. or lower and an antioxidant is added.

In addition, when a method is employed in which the imidization is conducted by subjecting the film to a heat treatment, the heat treatment may be conducted under a high-oxygen concentration atmosphere (an atmosphere with an oxygen concentration which is higher than 300 ppm but not higher than 10000 ppm), as long as color development due to oxygen can be suppressed. Note that, to conduct the imidization under a high-oxygen concentration atmosphere (an atmosphere with an oxygen concentration which is higher than 300 ppm but not higher than 10000 ppm) by the heat treatment, it is preferable to use, for example, a fluorine-containing diamine such as 2,2-bis(4-aminophenyl)-hexafluoropropane, 2,2'-bis(trifluoromethyl)-4,4'-diaminobiphenyl, or 2,2-bis(4-aminophenoxyphenyl)hexafluoropropane, a sulfone-based diamine such as 3,3'-diaminodiphenyl sulfone or 4,4'-diaminodiphenyl sulfone as the aromatic diamine.

Conducting the imidization by subjecting the film to a heat treatment as described above enables efficient dehydration ring-closure of the polyamic acid in the film, and this makes it possible to efficiently conduct imidization of the polyamic acid to form the polyimide. In addition, the film can also be thermally cured by conducting the heat treatment as described above to form the polyimide, and this makes it possible to more efficiently obtain a film made of a polyimide.

Thus, the film made of the polyimide having a repeating unit represented by the above-described general formula (5) can be formed. Note that $R^1$, $R^2$, $R^3$, and n in the above-described general formula (5) are the same as $R^1$, $R^2$, $R^3$, and n in the general formula (1), respectively (have the same meanings as those of $R^1$, $R^2$, $R^3$, and n in the general formula (1), respectively), and preferred examples thereof are also the same as those of $R^1$, $R^2$, and $R^3$, and n in the above-described general formula (1). In addition, $R^{10}$ in the above-described general formula (5) is the same as $R^{10}$ in the above-described general formula (2) (has the same meaning as that of $R^{10}$ in the general formula (2)), and preferred examples thereof are also the same as those of $R^{10}$ in the above-described general formula (2). In addition, the polyimide preferably mainly contains a repeating unit represented by the above-described general formula (5) (more preferably the content of the repeating unit represented by the above-described general formula (5) is 90 to 100% by mole relative to all the repeating units). The thus obtained film made of the polyimide is the same as the polyimide film of the present invention described later.

The polyimide forming the film has a 5% weight loss temperature of preferably 350° C. or higher and more preferably 450 to 550° C. Note that the 5% weight loss temperature can be determined as follows. Specifically, by using a thermogravimetric analyzer (for example, one manufactured by SII NanoTechnology Inc. under the trade name of "TG/DTA220") as a measuring device, the temperature is raised under a nitrogen gas atmosphere with the scan temperature set at 30° C. to 550° C. under a condition of a rate of temperature rise of 10° C./min., and the temperature at which the weight of the sample used decreases by 5% is measured. Note that, for the measurement, the sample is preferably used with the mass thereof being 1.0 mg to 10 mg (more preferably 1.5 mg to 4.0 mg). By setting the mass of the sample in the above-described range, the same value can be measured for the same polyimide, even when measurement is conducted by changing the mass of the sample.

In addition, the polyimide forming the film has a glass transition temperature of preferably 200° C. or higher, further preferably 250° C. to 500° C., and particularly preferably 300° C. to 450° C. As the glass transition temperature of the polyimide, a value (a value measured by the so-called penetration (needle penetration) method) can be employed which is determined by using a thermomechanical analyzer (for example, one manufactured by Rigaku Corporation under the trade name of "TMA8311") as a measuring device, and performing scanning under a condition of a rate of temperature rise of 5° C./minute under a nitrogen atmosphere in a penetration mode from 30° C. to 550° C. Note that a softening temperature described below can be measured simultaneously with the glass transition temperature under the same measurement conditions as those for the glass transition temperature (when the glass transition temperature is detected, a peak appears before the softening temperature).

In addition, the polyimide has a softening temperature of preferably 300° C. or higher, and more preferably 350 to 550° C. Note that the softening temperature can be determined by using a thermomechanical analyzer (manufactured by Rigaku Corporation under the trade name of "TMA8311") in a penetration mode (can be measured by the so-called penetration (needle penetration) method). Note that, as a method for measuring the softening temperature, for example, a method (the so-called penetration (needle penetration) method) may be employed in which a film made of a polyimide having a size of 5 mm in length, 5 mm in width, and 13 µm in thickness is prepared as a sample to be measured, and the softening temperature is measured by using a thermomechanical analyzer (manufactured by Rigaku Corporation under the trade name of "TMA8311") as a measuring device and conducting needle penetration using a transparent silica glass pin (tip diameter: 0.5 mm) into the film under a nitrogen atmosphere and employing a condition of a rate of temperature rise of 5° C./minute under a condition of a temperature range of from 30° C. to 550° C.

Moreover, the number average molecular weight (Mn) of the polyimide is preferably 1000 to 100000 in terms of polystyrene. In addition, the weight average molecular weight (Mw) of the polyimide is preferably 1000 to 500000 in terms of polystyrene. Moreover, the molecular weight distribution (Mw/Mn) of the polyimide is preferably 1.1 to 5.0. Note that the molecular weight (Mw or Mn) and the molecular weight distribution (Mw/Mn) of the polyimide can be determined by converting data measured by using a gel permeation chromatography as a measuring device to those in terms of polystyrene. Note that when it is difficult to measure the molecular weight of such a polyimide, it is possible to select and use a polyimide suitable for the application and the like by analogically determining the molecular weight and the like on the basis of the viscosity of the polyamic acid used for producing the polyimide.

In addition, the polyimide more preferably has a total luminous transmittance of 80% or higher (further preferably 85% or higher, and particularly preferably 87% or higher) from the viewpoint of, for example, obtaining a higher transparency. In addition, the polyimide more preferably has a haze (turbidity) of 5 to 0 (further preferably 4 to 0, and particularly preferably 3 to 0) from the viewpoint of, for example, obtaining a higher transparency. Moreover, the polyimide more preferably has a yellowness index (YI) of 5 to 0 (further preferably 4 to 0, and particularly preferably 3 to 0) from the viewpoint of, for example, obtaining a higher transparency. The total luminous transmittance, the haze (turbidity), and the yellowness index (YI) can be easily achieved by selecting the kind of the polyimide and the like, as appropriate. Note that, as the total luminous transmittance, the haze (turbidity), and the yellowness index (YI), values can be employed which are measured by using a measuring device manufactured by NIPPON DENSHOKU INDUSTRIES CO., LTD. under the trade name of "HAZE METERNDH-5000" or a measuring device manufactured by NIPPON DENSHOKU INDUSTRIES CO., LTD. under the trade name of "Spectrophotometer SD6000" (the total luminous transmittance and the haze are measured with the measuring device manufactured by NIPPON DENSHOKU INDUSTRIES CO., LTD. under the trade name of "HAZE METER NDH-5000", and the yellowness index is measured with the measuring device manufactured by NIPPON DEN-SHOKU INDUSTRIES CO., LTD. under the trade name of "Spectrophotometer SD6000") and using a film made of a polyimide and having a thickness of 5 to 20 µm as a sample for measurement. Note that, regarding the total luminous transmittance, the haze (turbidity), and the yellowness index (YI), the same measured values can be obtained from the same polyimide, because the thickness of the film made of a polyimide and having a thickness of 5 to 20 µm is sufficiently small, and does not exert any influence on the measured values. For this reason, for the measurement of the total luminous transmittance, the haze (turbidity), and the yellowness index (YI), it is only necessary to use a film having a thickness within the above-described range. In addition, the length and the width of the sample to be measured may be any, as long as the sample with that size can be placed in a measuring position of the above-described measuring device, and the length and the width may be changed, as appropriate. Note that the total luminous transmittance is determined by conducting measurement in accordance with JIS K7361-1 (issued in 1997), the haze (turbidity) is determined by conducting measurement in accordance with JIS K7136 (issued in 2000), and the yellowness index (YI) is determined by conducting measurement in accordance with ASTM E313-05 (issued in 2005).

In addition, the polyimide has a linear expansion coefficient of preferably 0 to 100 ppm/K, more preferably 5 to 60 ppm/K, and further preferably 10 to 30 ppm/K. If the linear expansion coefficient exceeds the upper limit, peeling due to thermal history tends to easily occur when a composite material is formed in combination with a metal or an inorganic material having a linear expansion coefficient in a range of 5 to 20 ppm/K. As for a method for measuring the linear expansion coefficient of the polyimide, a value obtained as follows is employed. Specifically, a polyimide film having a size of 20 mm in length and 5 mm in width (the thickness of the film is preferably 10 to 30 µm, although the thickness is not particularly limited, because it does not exert any influence on the measured value) is formed and employed as a sample to be measured. Then, by using a thermomechanical analyzer (manufactured by Rigaku Corporation under the trade name of "TMA8310") as a measuring device, the changes in length of the sample in the longitudinal direction are measured from 50° C. to 200° C. under a nitrogen atmosphere by employing conditions of tensile mode (49 mN) and a rate of temperature rise of 5° C./minute. Then, the average value of changes in length per degree Celsius in the temperature range of 50° C. to 200° C. is determined. The thus obtained value is employed.

Note that although it is not exactly clear why the method for producing a polyimide film of the present invention comprising the above-described first to third steps enables efficient production of a film having a higher surface smoothness, the present inventors have speculate as follows. Specifically, in the method for producing a polyimide film of the present invention, the compound represented by the above-described general formula (4) is used, while using the polyamic acid solution having a sufficiently low viscosity. Hence, the compound represented by the above-described general formula (4) functions like a catalyst during the imidization, allowing the increase in molecular weight and the ring-closure dehydration reaction (imidization reaction) of the polyamic acid to sufficiently proceed on the substrate during the coating and drying of the substrate. This enables the imidization reaction to sufficiently proceed without formation of cracks or the like in the obtained film. In addition, since the polyamic acid solution having a sufficiently low viscosity can be used to produce the film, it is possible to keep the uniform coatability resulting from the low-viscosity. Therefore, the surface can be made flat and smooth at a higher level.

Hereinabove, the method for producing a polyimide film of the present invention is described. Hereinafter, a polyimide film of the present invention is described.

[Polyimide Film of the Present Invention]

A polyimide film of the present invention is obtained by the above-described method for producing a polyimide film of the present invention.

Accordingly, the polyimide film of the present invention is a film made of a polyimide having a repeating unit represented by the above-described general formula (5) and being obtained by the above-described method for producing a polyimide film of the present invention. Note that the polyimide forming the film is the same as that described for the above-described method for producing a polyimide film of the present invention. In addition, $R^1$, $R^2$, $R^3$, and n in the above-described general formula (5) are the same as $R^1$, $R^2$, $R^3$, and n in the general formula (1), respectively, and preferred examples thereof are also the same as $R^1$, $R^2$, $R^3$, and n in the above-described general formula (1). In addition, $R^{10}$ in the above-described general formula (5) is the same as $R^{10}$ in the above-described general formula (2), and preferred examples thereof are also the same as those of $R^{10}$ in the above-described general formula (2).

The polyimide film is a film having a high surface smoothness, because it is obtained by the above-described method for producing a polyimide film of the present invention. The polyimide film has a surface arithmetic mean roughness Ra of more preferably 0.01 to 2.0 nm, further preferably 0.1 to 1.5 nm, and particularly preferably 0.5 to 1.0 nm. As the value of the surface arithmetic mean roughness (Ra, unit: nm) of the polyimide film, a value determined by a measuring method according to "JIS B0601 (issued in 1994)" described below is employed. Specifically, as the method for measuring the arithmetic mean roughness (Ra, unit: nm), a method is employed in which the arithmetic mean roughness (Ra) is measured by determining the arithmetic mean roughnesses at ten points according to JIS B0601 (issued in 1994) under conditions of a measurement width of 500 μm, an X pitch of 0.30 μm, a Y pitch of 2 μm, a Z measurement magnification of 50000, and an X feed speed of 0.2 mm/s. Note that, for the measurement, for example, a high-precision microfigure measuring instrument "trade name: SUREFCORDER ET 4000A" manufactured by Kosaka Laboratory Ltd. can be used as a device for measuring the arithmetic mean roughness (Ra, unit: nm).

In addition, the form of the polyimide film is not particularly limited, as long as the polyimide film is in a film shape. The polyimide film can be designed to have any of various shapes (a disk shape, a cylindrical shape (a film processed into a tube), and the like), as appropriate. When the polyimide film is produced by using the above-described polyimide solution of the present invention, it is also possible to more easily change the design of the polyimide film.

Moreover, the thickness of the polyimide film of the present invention is not particularly limited, and is preferably 0.1 to 200 μm, and more preferably 1 to 100 μm.

In addition, since the polyimide forming the film is an alicyclic polyimide having a sufficiently high transparency and a sufficiently high heat resistance, the polyimide film can be preferably used as a material used for applications of, for example, a film for a flexible wiring board (FPC substrate), an FCCL substrate, heat resistant insulating tape, an enameled wire, a protective coating agent of a semiconductor, a liquid crystal orientation film, a transparent electrically conductive film for organic EL, a TFT substrate for organic EL, a substrate for a color filter, a substrate for a touch panel, a film alternative to cover glass, a flexible substrate film, a flexible transparent electrically conductive film, a transparent electrically conductive film for an organic thin film-type solar cell, a transparent electrically conductive film for a dye-sensitized type solar cell, a flexible gas barrier film, a film for a touch panel, a seamless polyimide belt (a so-called transfer belt) for a copier, transparent electrode substrates (a transparent electrode substrate for an organic EL, a transparent electrode substrate for a solar cell, a transparent electrode substrate of an electronic paper, and the like), an interlayer insulating film, a sensor substrate, a substrate of an image sensor, a reflective plate of a light-emitting diode (LED) (a reflective plate of LED lighting: LED reflective plate), a cover for LED lighting, a cover for LED reflective plate lighting, a coverlay film, a high ductility composite substrate, a resist for semiconductor, a lithium-ion battery, a substrate for an organic memory, a substrate for an organic transistor, a substrate for an organic semiconductor, a color filter base material, a front film, and the like, and as the like, as appropriate. In addition, because of its sufficiently high surface smoothness, the polyimide film of the present invention is useful especially for applications where surface smoothness is required, for example, a substrate of an organic EL element (if the surface smoothness of the substrate of an organic EL element is high, it is possible to suppress occurrence of a short circuit between an electrode provided on the substrate and another electrode at a higher level. For this reason, a film having a surface which is flat and smooth at a higher level is preferably used as a substrate of an organic EL element), a substrate for a high-definition display, a substrate for a high-definition display for medical use, a substrate for a transparent display, a display substrate for signage, and the like.

Hereinabove, the polyimide film of the present invention is described. Hereinafter, a polyamic acid solution (a solution including a polyamic acid solution of the present invention as one preferred embodiment thereof) is described.

[Polyamic Acid Solution]

The polyamic acid solution contains a solvent and a polyamic acid having a repeating unit represented by the above-described general formula (3), and has a viscosity of 5 to 150 cps.

The solvent and the polyamic acid in the polyamic acid solution are the same as the solvent and the polyamic acid described for the above-described method for producing a polyimide film of the present invention, respectively (preferred examples thereof are also the same). Moreover, the viscosity of the polyamic acid solution is the same as the viscosity of the polyamic acid solution described for the above-described method for producing a polyimide film of the present invention (a preferred range thereof is the same). Accordingly, the polyamic acid solution is the same as the polyamic acid solution described as one obtained by the first step of the above-described method for producing a polyimide film of the present invention.

Regarding the method for producing the polyamic acid solution, the polyamic acid solution is preferably obtained by the first step of the above-described method for producing a polyimide film of the present invention. Specifically, the polyamic acid solution is preferably a polyamic acid solution having a viscosity of 5 to 150 cps which is obtained by preparing a raw material mixture liquid that contains the solvent, the tetracarboxylic dianhydride represented by the above-described general formula (1), and the aromatic diamine represented by the above-described general formula (2), and that has a total content of the tetracarboxylic dianhydride and the aromatic diamine of 15% by mass or less, and reacting the tetracarboxylic dianhydride and the aromatic diamine with each other in the raw material mixture liquid to form a polyamic acid having a repeating unit represented by the above-described general formula (3). In addition, properties (for example, the content of the polyamic acid, and the like) of the polyamic acid solution are the same as those described for the first step of the above-described method for producing a polyimide film of the present invention.

In addition, the polyamic acid solution preferably further comprises a compound represented by the above-described general formula (4). In other words, the polyamic acid solution is more preferably a polyamic acid solution of the present invention that contains a solvent, a polyamic acid having a repeating unit represented by the above-described general formula (3), and a compound (imidazole-based compound) represented by the above-described general formula (4), and that has a viscosity of 5 to 150 cps.

When the polyamic acid solution is used after the compound (imidazole-based compound) represented by the above-described general formula (4) is added thereto, it is possible to efficiently produce a polyimide film having a sufficiently flat and smooth surface. For this reason, the polyamic acid solution is especially useful as a raw material solution (resin solution: varnish) for producing a polyimide film used in various applications.

In addition, because of its low viscosity, the polyamic acid solution not only can be preferably used as a raw material solution for producing a polyimide film, but also can be preferably used in other applications. Applications in which the polyamic acid solution can be preferably used are not limited to a raw material solution for producing a polyimide film, but the polyamic acid solution is also useful as, for example, a raw material solution for a photosensitive composition, or the like. An example of the photosensitive composition in which the polyamic acid solution can be preferably used may be the polyamic acid solution to which a photosensitive agent is added. Note that the photosensitive composition is described later.

In addition, the polyamic acid solution of the present invention comprises the compound represented by the above-described general formula (4). The polyamic acid solution comprising the compound represented by the general formula (4) (the above-described polyamic acid solution of the present invention) is preferably the same as the "polyimide-forming mixture liquid (note that the polyimide-forming mixture liquid can be considered as a preferred embodiment of the polyamic acid solution)" described for the above-described method for producing a polyimide of the present invention.

Hereinabove, the polyamic acid solution and the like are described. Hereinafter, a photosensitive composition is described.

[Photosensitive Composition]

A photosensitive composition comprises: the above-described polyamic acid solution (one containing a solvent, and a polyamic acid having a repeating unit represented by the above-described general formula (3) and having a viscosity of 5 to 150 cps); and a photosensitive agent.

The photosensitive composition comprising the polyamic acid solution and the photosensitive agent preferably further comprises the compound represented by the above-described general formula (4). When the photosensitive composition in the form further comprising the compound represented by the general formula (4) is used, it is possible to obtain a good cured film or a cured pattern, even when the low viscosity (low-molecular weight) polyamic acid solution is used as the raw material solution for the photosensitive composition, because the compound represented by the above-described general formula (4) is also an agent for promoting the increase in molecular weight. Accordingly, the photosensitive composition is preferably the photosensitive composition of the present invention comprising the above-described polyamic acid solution of the present invention (one containing a solvent, a polyamic acid having a repeating unit represented by the above-described general formula (3), and a compound represented by the above-described general formula (4), and having a viscosity of 5 to 150 cps); and a photosensitive agent.

In addition, the photosensitive composition may be either of a positive type or of a negative type. The photosensitive composition is a positive-type photosensitive composition, for example, when a photosensitive agent having a function of increasing the solubility of a portion irradiated with light in a liquid developer is used as the photosensitive agent. On the other hand, the photosensitive composition is a negative-type photosensitive composition, for example, when a photosensitive agent having a function of decreasing the solubility of a portion irradiated with light in a liquid developer is used as the photosensitive agent. Hereinafter, preferred embodiments of each of the positive-type and negative-type photosensitive compositions are described separately; however, the photosensitive compositions of the present invention are not limited thereto.

<Positive-Type Photosensitive Composition>

A preferred example of the positive-type photosensitive composition is one comprising (A) the polyamic acid solution (one containing a solvent, and a polyamic acid having a repeating unit represented by the above-described general formula (3), and having a viscosity of 5 to 150 cps), and (B) a photoacid generator. In this case, the polyamic acid solution more preferably comprises (C) a compound represented by the above-described general formula (4). (A) The polyamic acid solution and (C) the compound represented by the above-described general formula (4) in the positive-type photosensitive composition are the same as those already described above.

In addition, (B) the photoacid generator preferably used in the positive-type photosensitive composition may be one used as a so-called photosensitive agent, and examples thereof include conventionally known ones such as quinonediazide group-containing compounds, aryldiazonium salts, diaryliodonium salts, and triarylsulfonium salts. The quinonediazide group-containing compounds include ortho-quinonediazide compounds, and diazonaphthoquinone compounds, and exampled thereof include completely esterified products or partially esterified products of phenol compounds (also referred to as phenolic hydroxy group-containing compounds) with naphthoquinonediazidesulfonic acid compounds; and ortho-quinonediazide compounds obtained by condensation reaction of ortho-quinonediazidesulfonyl chlorides with hydroxy compounds, amino compounds, or the like in the presence of an agent for removing hydrogen chloride.

Examples of the ortho-quinonediazidesulfonyl chlorides include benzoquinone-1,2-diazido-4-sulfonyl chloride, 1-naphthoquinone-2-diazido-5-sulfonyl chloride (hereinafter, also referred to as 5-naphthoquinonediazidesulfonic acid chloride), 1-naphthoquinone-2-diazido-4-sulfonyl chloride (hereinafter, also referred to as 4-naphthoquinonediazidesulfonic acid chloride), and the like.

Meanwhile, examples of the hydroxy compounds include hydroquinone, resorcinol, pyrogallol, bisphenol A, 4,4'-[1-[4-[1-methyl-1-(4-hydroxyphenyl)ethyl]phenyl]ethylidene]bisphenol, bis(4-hydroxyphenyl)methane, 2,2-bis(4-hydroxyphenyl)hexafluoropropane, 2,3,4-trihydroxybenzophenone, 2,3,4,4'-tetrahydroxybenzophenone, 2,2',4,4'-tetrahydroxybenzophenone, 2,3,4,2',3'-pentahydroxybenzophenone, 2,3,4,3',4',5'-hexahydroxybenzophenone, bis(2,3,4-trihydroxyphenyl)methane, bis(2,3,4-trihydroxyphenyl)propane, 4b,5,9b,10-tetrahydro-1,3,6,8-tetrahydroxy-5,10-dimethylindeno[2,1- a]indene, tris(4-hydroxyphenyl)methane, tris(4-hydroxyphenyl)ethane, 1,1-bis(4-hydroxyphenyl)-1-[4-{1-(4-hydroxyphenyl)-1-m ethylethyl}phenyl]ethane, and the like.

Moreover, examples of the amino compounds include p-phenylenediamine, m-phenylenediamine, 4,4'-diaminodiphenyl ether, 4,4'-diaminodiphenylmethane, 4,4'-diaminodiphenyl sulfone, 4,4'-diaminodiphenyl sulfide, o-aminophenol, m-aminophenol, p-aminophenol, 3,3'-diamino-4,4'-dihydroxybiphenyl, 4,4'-diamino-3,3'-dihydroxybiphenyl, bis(3-amino-4-hydroxyphenyl)propane, bis(4-amino-3-hydroxyphenyl)propane, bis(3-amino-4-hydroxyphenyl)sulfone, bis(4-amino-3-hydroxyphenyl)sulfone, bis(3-amino-4-hydroxyphenyl)hexafluoropropane, bis(4-amino-3-hydroxyphenyl)hexafluoropropane, and the like.

Among the ortho-quinonediazide compounds preferable as the quinonediazide group-containing compounds (among the above-described combinations), preferred are an ester compound obtained by a reaction of 1,1-bis(4-hydroxyphenyl)-1-[4-{1-(4-hydroxyphenyl)-1-m ethylethyl}phenyl] ethane with 1-naphthoquinone-2-diazido-5-sulfonyl chloride, and an ester compound obtained by a reaction of 4,4'-[1-[4-[1-methyl-1-(4-hydroxyphenyl)ethyl]phenyl]ethylidene]bisphenol with 4-naphthoquinonediazidesulfonic acid chloride or 5-naphthoquinonediazidesulfonic acid chloride, and these may be used as a mixture. When the above-described ester compounds are used as a mixture as described above, it is preferable to mix the ester compound (hereinafter (NQD1)) obtained by the reaction of 4,4'-[1-[4-[1-methyl-1-(4-hydroxyphenyl)ethyl]phenyl]ethylidene]bisphenol with 4-naphthoquinonediazidesulfonic acid chloride and the ester compound (hereinafter (NQD2)) obtained by the reaction of 4,4'-[1-[4-[1-methyl-1-(4-hydroxyphenyl)ethyl]phenyl]ethylidene]bisphenol with 5-naphthoquinonediazidesulfonic acid chloride with each other. In this case, the mixing ratio (NQD1:NQD2) is preferably 99:1 to 0.5:99.5, more preferably 95:5 to 1:99, and further preferably 90:10 to 3:97, in terms of properties after a curing treatment.

If necessary, the positive-type photosensitive composition can comprise other components such as a thermally cross-linking agent, a silicon-containing compound, a non-polymerizable binder polymer, a solvent, an elastomer, a dissolution promoter, a dissolution inhibitor, a surfactant or leveling agent, and a thermoacid generator.

The thermally cross-linking agent is not particularly limited, as long as the agent is a compound cross-linkable or polymerizable in a heat treatment step after development. The thermally cross-linking agent is preferably a compound having a methylol group, an alkoxymethyl group, an epoxy group, or a vinyl ether group in its molecule. Examples thereof include, but are not limited to, methylol group-containing compounds such as 1,2-benzenedimethanol, 1,3-benzenedimethanol, 1,4-benzenedimethanol, 1,3,5-benzenetrimethanol, 4,4-biphenyldimethanol, 2,6-pyridinedimethanol, 2,6-bis(hydroxymethyl)-p-cresol, and 4,4'-methylenebis(2,6-dialkoxymethylphenol); alkoxymethyl group-containing compounds such as 1,4-bis(methoxymethyl)benzene, 1,3-bis(methoxymethyl)benzene, 4,4'-bis(methoxymethyl)biphenyl, 3,4'-bis(methoxymethyl)biphenyl, 3,3'-bis(methoxymethyl)biphenyl, methyl 2,6-naphthalenedicarboxylate, and 4,4'-methylenebis(2,6-dimethoxymethylphenol); methylolmelamine compounds such as hexamethylolmelamine and hexabutanolmelamine; alkoxymelamine compounds such as hexamethoxymelamine; alkoxymethylglycoluril compounds such as tetramethoxymethylglycoluril; methylolbenzoguanamine compounds; methylolurea compounds such as dimethylolethyleneurea; cyano compounds from dicyanoaniline, dicyanophenol, and cyanophenylsulfonic acid; isocyanate compounds such as 1,4-phenylene diisocyanate and 3,3'-dimethyldiphenylmethane-4,4'-diisocyanate; epoxy group-containing compounds such as ethylene glycol diglycidyl ether, bisphenol A diglycidyl ether, triglycidyl isocyanurate, bisphenol A-type epoxy resin, bisphenol F-type epoxy resin, naphthalene-based epoxy resins, biphenyl-type epoxy resins, and phenol novolac resin-type epoxy resins; maleimide compounds such as N,N'-1,3-phenylenedimaleimide and N,N'-methylenedimaleimide; and the like. One of these thermally cross-linking agents may be used, or two or more thereof may be used in combination.

Meanwhile, examples of the silicon-containing compound include silicon-containing resins, silicon-containing resin precursors, silane coupling agents, and the like. Of these examples, preferred are silane coupling agents, and more preferred are ureido group-containing silane coupling agents such as 1-(2 pyridyl)-3-[3-(trimethoxysilyl)propyl]urea and 1-(3 pyridyl)-3-[3-(triethoxysilyl)propyl]urea.

In addition, a preferred content ratio of each component in the positive-type photosensitive composition is as follows. The content of (A) the polyamic acid solution is such that the resin content in (A) is preferably 50% by mass or more, and more preferably 60 to 90% by mass, relative to the total solid content of the positive-type photosensitive composition. The content of (B) the photoacid generator is preferably 3 to 50 parts by mass, and more preferably 5 to 30 parts by mass relative to 100 parts by mass of the resin content in (A) the polyamic acid solution in terms of sensitivity and the like. The content of (C) the compound represented by the above-described general formula (4) is preferably 0.5 to 60 parts by mass, and more preferably 1 to 40 parts by mass, relative to 100 parts by mass of the resin content in (A) the polyamic acid solution.

In addition, when the positive-type photosensitive composition comprises a thermally cross-linking agent, the content of the thermally cross-linking agent is preferably 1 to 50 parts by mass relative to 100 parts by mass of the resin content of (A) the polyamic acid solution. In addition, when the positive-type photosensitive composition comprises a silane compound, the content of the silane compound is preferably 0.1 to 20 parts by mass, and further preferably 1 to 10 parts by mass, relative to 100 parts by mass of the resin content of (A) the polyamic acid solution.

In addition, the solid content concentration in the positive-type photosensitive composition is preferably 30% by mass or less, more preferably 1 to 20% by mass, and further preferably 5 to 15% by mass.

<Negative-Type Photosensitive Composition>

A preferred example of the negative-type photosensitive composition may be one comprising (A) the polyamic acid solution (one containing a solvent, and a polyamic acid having a repeating unit represented by the above-described general formula (3), and having a viscosity of 5 to 150 cps), and (D) a photobase generator. In this case, the polyamic acid solution more preferably comprises (C) a compound represented by the above-described general formula (4).

(A) The polyamic acid solution (one comprising a solvent, and a polyamic acid having a repeating unit represented by the above-described general formula (3), and having a viscosity of 5 to 150 cps) and (C) the compound represented by the above-described general formula (4) in the negative-type photosensitive composition are the same as those already described above.

(D) The photobase generator is one used as a so-called photosensitive agent, and generates a base upon light exposure. Examples of the photobase generator include conventionally known ones, including compounds capable of being decomposed by action of light to generate an imidazole-based compound, such as (E)-3-(4-methoxyphenyl)-1-(1H-imidazol-1-yl)-2-propen-1-one, and (E)-1-(1H-imidazol-1-yl)-3-phenyl-2-propen-1-one; oxime ester compounds such as (E)-2-(hydroxyimino)-1-(4-(phenylthio)phenyl)-2-o-tolylethanone and (E)-2-(acetoxyimino)-1-(9-ethyl-6-(2-methylbenzoyl)-9H-carbazol-3-yl)-2-(o-tolyl)ethanone; the like.

If necessary, the negative-type photosensitive composition can comprise other components which are the same as those for the above-described positive-type photosensitive composition.

In addition, a preferred content ratio of each component in the negative-type photosensitive composition is as follows. The content of (A) the polyamic acid solution is such that the resin content in (A) is preferably 50% by mass or more, and more preferably 60 to 90% by mass, relative to the total solid content of the negative-type photosensitive composition. The content of (D) the photobase generator is preferably 0.1 to 50 parts by mass, and more preferably 0.5 to 30 parts by mass relative to 100 parts by mass of the resin content in (A) the polyamic acid solution in terms of sensitivity and the like. The content of (C) the compound represented by the above-described general formula (4) is preferably 0.5 to 60 parts by mass, and more preferably 1 to 40 parts by mass, relative to 100 parts by mass of the resin content in (A) the polyamic acid solution.

In addition, when the negative-type photosensitive composition comprises a silane compound, the content of the silane compound is preferably 0.1 to 20 parts by mass, and further preferably 1 to 10 parts by mass, relative to 100 parts by mass of the resin content in (A) the polyamic acid solution.

Moreover, the solid content concentration in the negative-type photosensitive composition is preferably 30% by mass or less, more preferably 1 to 20% by mass, and further preferably 5 to 15% by mass.

The photosensitive composition of the present invention makes it possible to form a pattern by employing a known light exposure method and a known development method, as appropriate, according to the type of the photosensitive agent (the type of the photosensitive composition) used. Note that a method for producing a pattern using the photosensitive composition of the present invention is briefly described below.

<Method for Producing Pattern Using Photosensitive Composition>

The method for producing a pattern is preferably a method comprising:

a photosensitive composition film formation step of applying the above-described photosensitive composition of the present invention onto a substrate followed by drying to form a photosensitive composition film, a light exposure step of exposing the photosensitive composition film to light; and a development step of developing the photosensitive resin film having been exposed to light to obtain a pattern. Note that when the above-described photosensitive composition of the present invention is of a positive type, the method for producing a pattern preferably further comprises a heat treatment step of curing the pattern. In addition, when the above-described photosensitive composition of the present invention is of a negative type, a heat treatment may be conducted simultaneously with the light exposure or after the light exposure but before the development step in the method for producing a pattern.

The photosensitive composition film formation step is not particularly limited, and it is possible to employ the same method as that for the third step (the step of obtaining a film made of a polyimide) of the above-described method for producing a polyimide film of the present invention.

In addition, examples of radiation used for the light exposure in the light exposure step include ultraviolet rays, electron beams, laser beams, and the like emitted from a low-pressure mercury lamp, a high-pressure mercury lamp, a metal halide lamp, a g-line stepper, an i-line stepper, and the like. The amount of light exposure may be set, as appropriate, according to the light source used, the film thickness of the coating film, and the like.

In addition, examples of the development method in the development step include a shower development method, a spray development method, an immersion development method, a puddle development method, and the like. As a liquid developer, an alkaline liquid developer is preferable, and it is possible to use an aqueous solution containing one or more alkaline compounds selected from inorganic alkaline compounds and organic alkaline compounds. The concentration of the alkaline compound in the liquid developer is, for example, about 1 to 10% by mass.

Moreover, when the heat treatment step is included, heating conditions may be set, as appropriate, as in the case of the heat treatment in the above-described third step.

EXAMPLES

Hereinafter, the present invention is described more specifically on the basis of Examples and Comparative Examples; however, the present invention is not limited to Examples below.

First, abbreviations of aromatic diamines used in Examples and Comparative Examples and the like are shown below.

[Chem 17]

| Name of Compound | Chemical Formula |
|---|---|
| 4,4'-Diaminobenzanilide (Abbreviation: DABAN) | $H_2N-C_6H_4-C(O)-NH-C_6H_4-NH_2$ |
| p-Phenylenediamine (Abbreviation: PPD) | $H_2N-C_6H_4-NH_2$ |

-continued

[Chem 17]

| Name of Compound | Chemical Formula |
|---|---|
| 4,4'-Diaminodiphenyl ether (Abbreviation: 4,4'-DDE) | 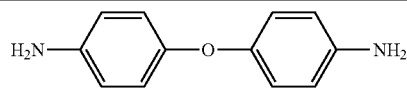 |
| 2,2'-Bis(trifluoromethyl) benzidine (Abbreviation: TFMB) | 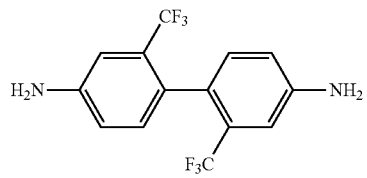 [SMILES: Nc1ccc(-c2ccc(N)cc2C(F)(F)F)c(C(F)(F)F)c1] |
| 2,2'-Bis{4-(4-aminophenoxy) phenyl}hexafluoropropane (Abbreviation: HFBAPP) | 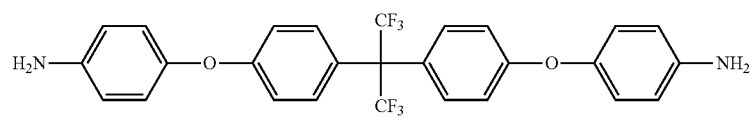 |

Note that all the aromatic diamines used were commercially available products (DABAN: manufactured by Nipponjunryo Chemicals, 4,4'-DDE: manufactured by Tokyo Chemical Industry Co., Ltd., PPD: manufactured by Aldrich, TFMB: manufactured by Wakayama Seika Kogyo Co., Ltd., HFBAPP: manufactured by Wakayama Seika Kogyo Co., Ltd.).

Next, methods for evaluating properties of polyimides obtained in Examples and Comparative Examples are described.

<Identification of Molecular Structure>

The molecular structures of polyimides obtained in Examples and Comparative Examples were identified by infrared absorption spectrometry (IR measurement). Note that, for the IR measurement, an IR spectrometer (manufactured by JASCO Corporation under the trade name of "FT/IR-4100") was used as a measuring device.

<Method for Measuring Viscosity of Polyamic Acid Solution>

The viscosities (unit: cps) of polyamic acid solutions obtained in Examples 1 to 5 and Comparative Examples 2 and 3 were measured as follows. Specifically, first, an RE-85 L model viscometer manufactured by TOKI SANGYO CO., LTD equipped with a standard cone rotor of 1°34'×R24 as a cone rotor was prepared as a viscosity-measuring device. Subsequently, the viscosity-measuring device (the above-described viscometer) was calibrated under a temperature condition of 25° C. by using a viscometer calibration standard solution JS20 manufactured by NIPPON GREASE Co., Ltd. (a viscometer calibration standard solution according to JIS Z8809 (issued in 2011)). Next, the viscosity of the polyamic acid solution was measured by using the calibrated viscosity-measuring device (viscometer) under a temperature condition of 25° C. and under a condition where the rotation speed of the cone rotor was in a range from 0.5 to 100 rpm. As described above; the method for measuring the viscosity of a polyamic acid solution was in accordance with JIS Z8803 (issued in 2011).

Note that the viscosity of the polyamic acid solution formed in Comparative Example 1 was measured as follows. Specifically, the polyamic acid solution formed in Comparative Example 1 was higher in viscosity than the polyamic acid solutions obtained in other examples and the like. Hence, to employ a method for measuring a viscosity suitable for the viscosity of a high-viscosity solution, the viscosity was measured by employing the same method as the method for measuring the viscosity used for the polyamic acid solutions obtained in Examples 1 to 5 and Comparative Examples 2 and 3, except that an optional cone rotor of 3°×R7.7 was used instead of the standard cone rotor, and that a viscometer calibration standard solution JS14000 manufactured by NIPPON GREASE Co., Ltd. was used for the calibration before the measurement instead of the use of the viscometer calibration standard solution JS20 manufactured by NIPPON GREASE Co., Ltd. (a viscometer calibration standard solution according to JIS Z8809 (issued in 2011)).

<Method for Measuring Arithmetic Mean Roughness (Ra, Unit: nm)>

The surface arithmetic mean roughness (Ra, unit: nm) of the polyimide film obtained in each of Examples and Comparative Examples was measured by the measuring method described below. Specifically, as a method for measuring the arithmetic mean roughness (Ra, unit: nm), a method was employed in which the arithmetic mean roughness (Ra, unit: nm) was determined at ten points by using a high-precision microfigure measuring instrument "trade name: SUREFCORDER ET 4000A" manufactured by Kosaka Laboratory Ltd. as a measuring device according to JIS B0601 (issued in 1994) under conditions of a measurement width of 500 μm, an X pitch of 0.30 μm, a Y pitch of 2 μm, a Z measurement magnification of 50000, and an X feed speed of 0.2 mm/s. Note that the surface on which the arithmetic mean roughness was measured was the surface of the film on the side not in contact with the surface of the glass substrate during the production of the polyimide film. Note that the arithmetic mean roughness is expressed as Surface Roughness in Table 1.

<Measurement of 5% Weight Loss Temperature (Td5%)>

The 5% weight loss temperature of the polyimide obtained in each of Examples and Comparative Examples was measured as follows. Specifically, a 5 mg sample of each of the polyimides was prepared, and placed in an aluminum sample pan. Then, by using a thermogravimetric analyzer (manufactured by SII NanoTechnology Inc. under the trade name of "TG/DTA220") as a measuring device, the sample was heated under a nitrogen gas atmosphere with the scan temperature being set from 30° C. to 550° C. under a condition of a rate of temperature rise of 10° C./minute, and the temperature at which the weight loss of the sample used reached 5% was measured.

<Measurement of Linear Expansion Coefficient (CTE)>

The linear expansion coefficient (unit: ppm/K) of the polyimide obtained in each of Examples and Comparative Examples were measured as follows. Specifically, a polyimide film having a size of 20 mm in length, 5 mm in width, and 13 μm in thickness was prepared as a sample to be measured. Then, by using a thermomechanical analyzer (manufactured by Rigaku Corporation under the trade name of "TMA8310") as a measuring device, the change in length of the sample was measured from 50° C. to 200° C. under a nitrogen atmosphere by employing conditions of a tensile mode (49 mN) and a rate of temperature rise of 5° C./minute, and the average value of the changes in length per degree Celsius over the temperature range of 50° C. to 200° C. was determined.

<Measurement of Total Luminous Transmittance, Haze (Turbidity), and Yellowness Index (YI)>

The total luminous transmittance value (unit: %), the haze (turbidity: HAZE), and the yellowness index (YI) were determined by using the polyimide (film-shaped polyimide) produced in each of Examples and Comparative Examples as a sample for measurement, as it was, and by conducting measurement using a measuring device manufactured by NIPPON DENSHOKU INDUSTRIES CO., LTD. under the trade name of "HAZE METERNDH-5000" or a measuring device manufactured by NIPPON DENSHOKU INDUSTRIES CO., LTD. under the trade name of "Spectrophotometer SD6000. Note that the total luminous transmittance and the haze were measured with the measuring device manufactured by NIPPON DENSHOKU INDUSTRIES CO., LTD. under the trade name of "HAZE METER NDH-5000," and the yellowness index was measured with the measuring device manufactured by NIPPON DENSHOKU INDUSTRIES CO., LTD. under the trade name of "Spectrophotometer SD6000." In addition, the total luminous transmittance was determined by conducting the measurement according to JIS K7361-1 (issued in 1997), and the haze (turbidity) was determined by conducting the measurement according to JIS K7136 (issued in 2000), and the chromaticity (YI) was determined by conducting the measurement according to ASTM E313-05 (issued in 2005).

<Measurement of Softening Temperature (Softening Point)>

The softening temperature of the polyimide produced in each of Examples and Comparative Examples was measured as follows. Specifically, as a sample to be measured, a film made of the polyimide having a size of 5 mm in length, 5 mm in width, and 13 μm in thickness was prepared. Then, by using a thermomechanical analyzer (manufactured by Rigaku Corporation under the trade name of "TMA8311") as a measuring device, the softening temperature was measured by conducting needle penetration using a transparent silica glass pin (tip diameter φ: 0.5 mm) into the film under a nitrogen atmosphere and under conditions of a rate of temperature rise of 5° C./minute and a temperature range of from 30° C. to 550° C. (measurement by the so-called penetration (needle penetration) method). For the measurement, the softening temperature was calculated on the basis of the measurement data according to the method described in JIS K 7196 (1991), except that the above-described sample to be measured was used.

<Measurement of Glass Transition Temperature>

The glass transition temperature (Tg) of the polyimide produced in each of Examples and Comparative Examples was measured under the same conditions as those for the measurement of the softening point simultaneously as follows (this is because the glass transition temperature is observed when the glass transition temperature is lower than the softening point). Specifically, a film made of the polyimide having a size of 5 mm in length, 5 mm in width, and 13 μm in thickness was prepared as a sample to be measured. By using a thermomechanical analyzer (manufactured by Rigaku Corporation under the trade name of "TMA8311") as a measuring device, the glass transition temperature (Tg) was measured by conducting needle penetration using a transparent silica glass pin (tip diameter φ: 0.5 mm) into the film under a nitrogen atmosphere and under conditions of a rate of temperature rise of 5° C./minute and a temperature range of from 30° C. to 550° C. (measurement by the so-called penetration (needle penetration) method). Note that the results of samples for which the glass transition temperature was not observed up to the softening temperature are indicated by Not Detected (N.D.) in Table 1.

Synthesis Example 1: Synthesis of Tetracarboxylic Dianhydride

A tetracarboxylic dianhydride (norbornane-2-spiro-α-cyclopentanone-α'-spiro-2''-norbornane-5,5'',6,6''-tetracarboxylic dianhydride: CpODA) represented by the following general formula (12):

[Chem 18]

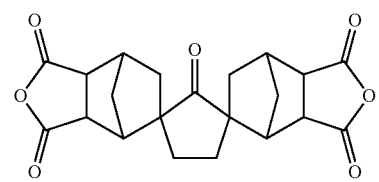

(12)

was prepared according to the methods described in Synthesis Example 1, Example 1, and Example 2 of International Publication No. WO2011/099518.

Synthesis Example 2: Synthesis of Imidazole-Based Compound

A compound (imidazole-based compound) represented by the following general formula (13):

[Chem 19]

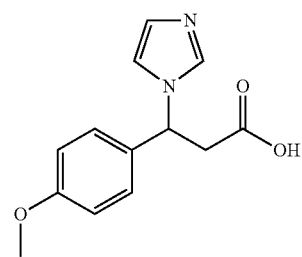

(13)

was synthesized as follows.

Specifically, first, 30 g of a cinnamic acid derivative represented by the following general formula (14):

[Chem 20]

(14)

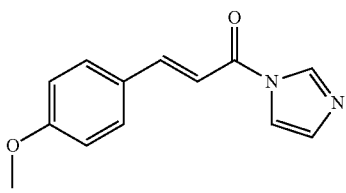

was dissolved in 200 g of methanol to obtain a solution. Then, 7 g of potassium hydroxide was further added to the solution to obtain a methanol solution. Subsequently, the methanol solution was stirred at 40° C. Next, methanol was removed by distillation from the methanol solution, and the obtained residue was suspended in 200 g of water to prepare a suspension. After that, 200 g of tetrahydrofuran was mixed with the obtained suspension, followed by stirring. Then, the water phase was obtained by liquid-liquid separation. After that, 4 g of hydrochloric acid was added to the liquid forming the water phase obtained by the liquid-liquid separation as described above under ice-cooling, followed by stirring. Then, 100 g of ethyl acetate was further mixed thereto, followed by stirring to prepare a mixture liquid. Next, the thus obtained mixture liquid was allowed to stand, and then the oil phase was obtained by separation. Subsequently, the target product was crystallized from the oil phase, and the precipitates were collected to obtain the above-described imidazole-based compound represented by general formula (13).

Note that the thus obtained imidazole-based compound was subjected to $^1$H-NMR measurement, and the results were as follows.

$^1$H-NMR (DMSO): 11.724 (s, 1H), 7.838 (s, 1H), 7.340 (d, 2H, J=4.3 Hz), 7.321 (d, 1H, J=7.2 Hz), 6.893 (d, 2H, J=4.3 Hz), 6.876 (d, 1H, J=6.1 Hz), 5.695 (dd, 1H, J=4.3 Hz, 3.2 Hz), 3.720 (s, 3H), 3.250 (m, 2H)

From the results of $^1$H-NMR measurement, it was found that the imidazole-based compound obtained in Synthesis Example 2 certainly had the structure represented by the above-described general formula (13).

Example 1

<First Step: Step of Obtaining Polyamic Acid Solution>

First, a 30 ml three-necked flask was sufficiently dried by heating with a heat gun. Next, the atmospheric gas in the sufficiently dried three-necked flask was substituted with nitrogen, to create a nitrogen atmosphere inside the three-necked flask. Subsequently, 0.2045 g (0.90 mmol) of 4,4'-diaminobenzanilide (manufactured by Nipponjunryo Chemicals: DABAN), which was an aromatic diamine, was introduced into the three-necked flask, and then 5.24 g of tetramethylurea was further added as a solvent, followed by stirring. Thus, a solution was obtained in which the aromatic diamine (DABAN) was dissolved in the solvent.

Next, to the three-necked flask containing the solution, 0.3459 g (0.90 mmol) of the tetracarboxylic dianhydride obtained in Synthesis Example 1 (the compound represented by the above-described general formula (12): CpODA) was added under a nitrogen atmosphere to prepare a raw material mixture liquid containing the solvent, the aromatic diamine (DABAN), and the tetracarboxylic dianhydride (CpODA) and having a total content ratio of the aromatic diamine (DABAN) and the tetracarboxylic dianhydride (CpODA) of 9.5% by mass.

Subsequently, the obtained raw material mixture liquid was stirred under a nitrogen atmosphere at room temperature (25° C.) for 4 hours to react the aromatic diamine (DABAN) and the tetracarboxylic dianhydride (CpODA) with each other. Thus, a polyamic acid was formed, and a polyamic acid solution was obtained. Note that the concentration of the polyamic acid in the obtained polyamic acid solution was 9.5% by mass, as is apparent also from the amounts of the raw materials added. In addition, the viscosity [cps (centipoise)] of the thus obtained polyamic acid solution (polyamic acid concentration: 9.5% by mass) was 15 cps. Table 1 shows the properties (viscosity) and the like of the polyamic acid solution.

<Second Step: Step of Obtaining Polyimide-Forming Mixture Liquid>

To the polyamic acid solution (polyamic acid concentration: 9.5% by mass) having a viscosity of 15 cps obtained by the above-described first step, 0.165 g of a powder of the imidazole-based compound obtained in Synthesis Example 2 (the imidazole-based compound represented by the above-described general formula (13)) was added, and dissolved by vigorous stirring, to prepare a polyimide-forming mixture liquid (coating liquid) containing the solvent, the polyamic acid, and the imidazole-based compound. Note that the total content of the polyamic acid and the imidazole-based compound (the compound represented by the above-described general formula (13)) was 12% by mass in the thus obtained polyimide-forming mixture liquid. Note that Table 1 shows the viscosity of the polyimide-forming mixture liquid (coating liquid).

<Third Step: Step of Obtaining Film Made of Polyimide>

Within 120 minutes after preparation of the polyimide-forming mixture liquid (coating liquid) by dissolving the imidazole-based compound in the polyamic acid solution (polyamic acid concentration: 9.5% by mass) in the above-described second step (within 60 minutes after the dissolution of the imidazole-based compound), the polyimide-forming mixture liquid was spin coated onto a surface of a glass substrate (manufactured by Corning Incorporated under the trade name of "EAGLE XG", length: 100 mm, width: 100 mm, thickness: 0.7 mm) made of non-alkaline glass, such that a film having a thickness of 13 μm was obtained after thermal curing. Thus, a coating film was formed on the glass substrate. After that, the glass substrate on which the coating film was formed was placed on a hot plate at 60° C. and allowed to stand for 2 hours, to remove the solvent from the coating film by evaporation (solvent removal treatment). Subsequently, the glass substrate on which the coating film was formed and which was subjected to the solvent removal treatment was introduced into an inert oven through which nitrogen was flowing at a flow rate of 3 L/minute, and allowed to stand in the inert oven under a nitrogen atmosphere and under a temperature condition of 25° C. for 0.5 hours. Then, the coating film was cured by heating under a temperature condition of 135° C. for 0.5 hours, and further heating under a temperature condition of 250° C. for 1 hour to conduct imidization of the polyamic acid. Thus, a film made of a polyimide was formed on the glass substrate. After that, the glass substrate on which the film made of the polyimide was formed was immersed in hot water at 90° C., to detach the polyimide film from the glass substrate. Thus, the polyimide film was obtained. Table 1 shows the evaluation results of properties of the thus obtained polyimide film.

Note that, by using the thus obtained film, the molecular structure of the compound forming the film was identified. FIG. 1 shows a graph of an IR spectrum obtained during infrared absorption spectrometry (IR measurement) for the identification of the molecular structure. As is apparent from the results shown in FIG. 1, C=O stretching vibration of imidocarbonyl was observed at 1698 cm$^{-1}$ in the graph of the IR spectrum of Example 1. Therefore, the film was certainly confirmed to be a film made of a polyimide.

Example 2

A polyimide film was obtained in the same manner as in Example 1, except that the time for which the raw material mixture liquid was stirred to react the aromatic diamine (DABAN) and the tetracarboxylic dianhydride (CpODA) with each other was changed from 4 hours to 5 hours in the first step (the step of obtaining a polyamic acid solution). Note that the viscosity of the polyamic acid solution was 17 cps. Table 1 shows the evaluation results of properties of the thus obtained polyimide film. Note that, by using the thus obtained film, the molecular structure of the compound forming the film was identified. Since C=O stretching vibration of imidocarbonyl was observed at 1698 cm$^{-1}$ in IR measurement, the film was certainly confirmed to be a film made of a polyimide.

Example 3

A polyimide film was obtained in the same manner as in Example 1, except that the amount of tetramethylurea added as the solvent was changed from 5.24 g to 4.03 g, and the time for which the raw material mixture liquid was stirred to react the aromatic diamine (DABAN) and the tetracarboxylic dianhydride (CpODA) with each other was changed from 4 hours to 10 hours in the first step (the step of obtaining a polyamic acid solution), and further that a solution of an imidazole-based compound was prepared in advance by dissolving 0.165 g of a powder of the imidazole-based compound obtained in Synthesis Example 2 (the imidazole-based compound represented by the above-described general formula (13)) in 1.22 g of tetramethylurea under a temperature condition of 60° C., and lowering the temperature back to room temperature (25° C.), and the solution was added to the polyamic acid solution instead of the addition of 0.165 g the powder of the imidazole-based compound obtained in Synthesis Example 2 (the imidazole-based compound represented by the above-described general formula (13)) to the polyamic acid solution in the second step. Note that, in this method, the total content ratio of the aromatic diamine (DABAN) and the tetracarboxylic dianhydride (CpODA) in the obtained raw material mixture liquid was 12% by mass, and the concentration of the polyamic acid in the polyamic acid solution was 12% by mass, as is apparent also from the amounts of the raw materials added. In addition, the viscosity of the polyamic acid solution was 46 cps. Table 1 shows the evaluation results of properties of the thus obtained polyimide film. Note that, by using the thus obtained film, the molecular structure of the compound forming the film was identified. Since C=O stretching vibration of imidocarbonyl was observed at 1698 cm$^{-1}$ by the IR measurement, the film was certainly confirmed to be a film made of a polyimide.

Example 4

Figure 2:
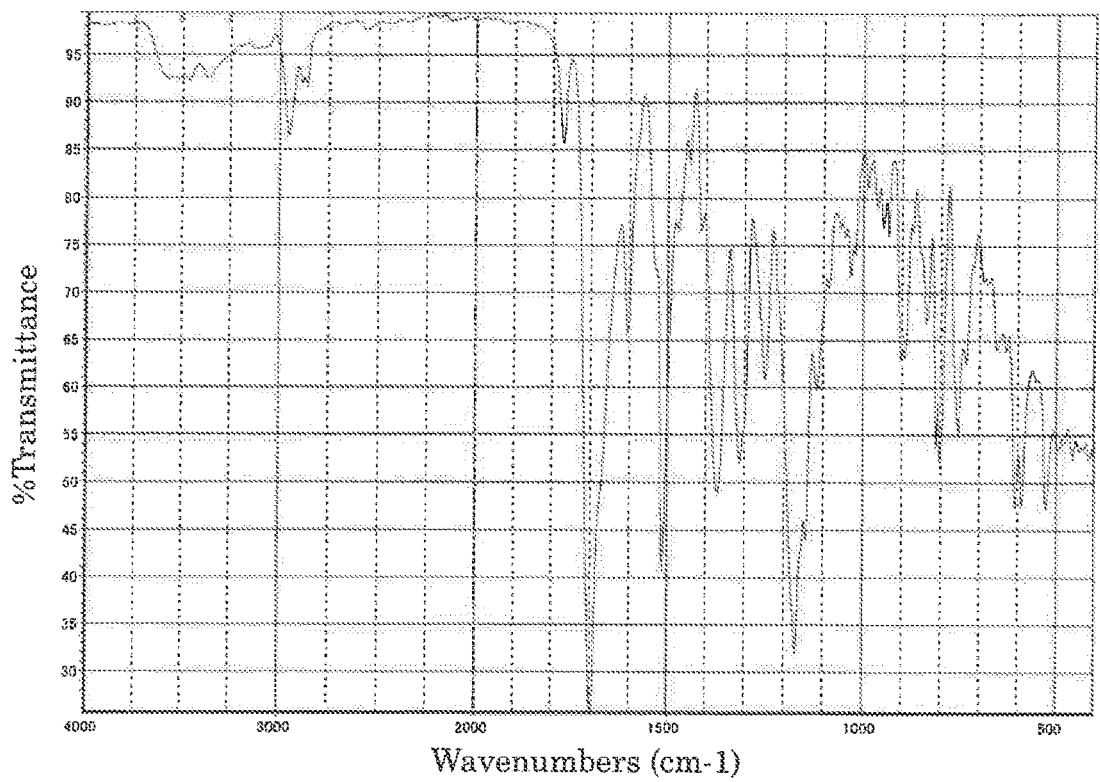
FIG. 2 is a graph showing an IR spectrum of a polyimide obtained in Example 4.

A polyimide film was obtained in the same manner as in Example 1, except that a mixture of 0.1636 g of 4,4'-diaminobenzanilide (0.72 mmol: manufactured by Nipponjunryo Chemicals: DABAN) and 0.0195 g of p-phenylenediamine (0.18 mmol: manufactured by Aldrich: PPD) (mole ratio [DABAN]:[PPD]=8:2) was used as the aromatic diamine instead of the use of 0.2045 g of 4,4'-diaminobenzanilide (0.90 mmol: manufactured by Nipponjunryo Chemicals: DABAN) alone as the aromatic diamine, that the amount of tetramethylurea added as the solvent was changed from 5.24 g to 5.04 g, and that the time for which the raw material mixture liquid was stirred to react the aromatic diamine and the tetracarboxylic dianhydride with each other was changed from 4 hours to 10 hours in the first step (the step of obtaining a polyamic acid solution). Note that, in this method, the total content ratio of the aromatic diamines (the mixture of DABAN and PPD) and the tetracarboxylic dianhydride (CpODA) in the obtained raw material mixture liquid was 9.5% by mass, and the concentration of the polyamic acid in the polyamic acid solution was 9.5% by mass, as is apparent also from the amounts of the raw materials added. Further, the viscosity of the polyamic acid solution was 24 cps. Table 1 shows the evaluation results of properties of the thus obtained polyimide film. Note that, by using the thus obtained film, the molecular structure of the compound forming the film was identified. FIG. 2 shows a graph of an IR spectrum obtained during infrared absorption spectrometry (IR measurement) for the identification of the molecular structure. As is apparent from the results shown in FIG. 2, C=O stretching vibration of imidocarbonyl was observed at 1698 cm$^{-1}$ in the graph of the IR spectrum of Example 4. Therefore, the film was certainly confirmed to be a film made of a polyimide.

Example 5

Figure 3:
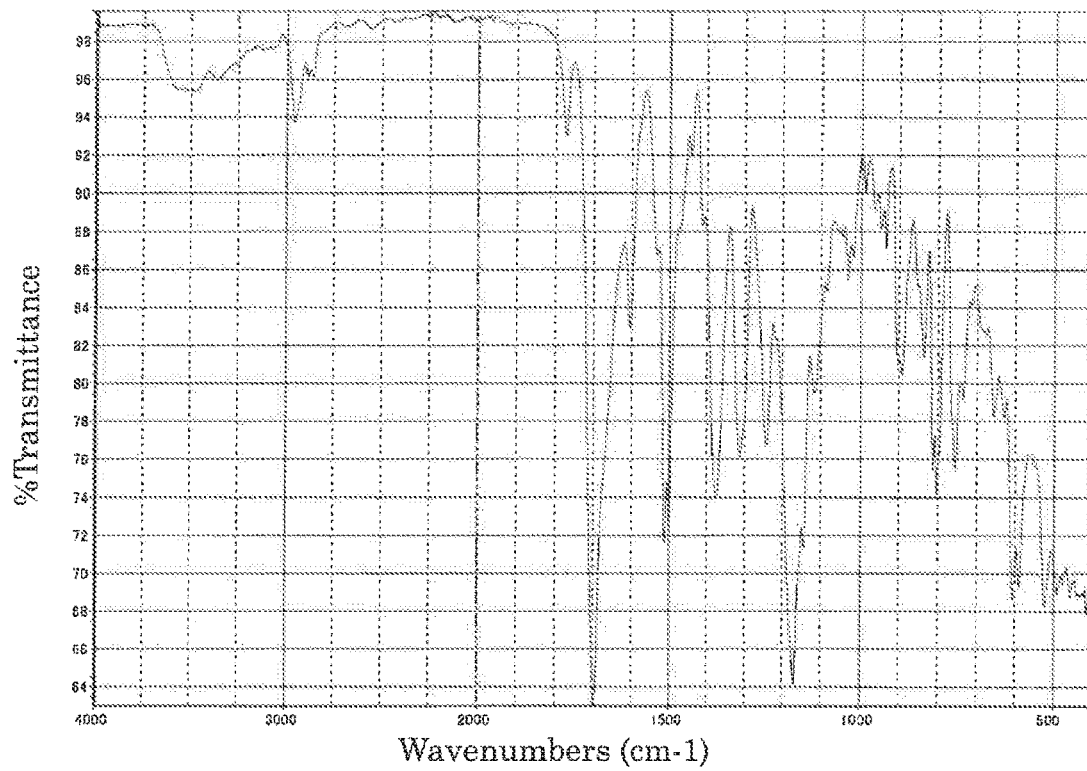
FIG. 3 is a graph showing an IR spectrum of a polyimide obtained in Example 5.

A polyimide film was obtained in the same manner as in Example 1, except that a mixture of 0.1636 g of 4,4'-diaminobenzanilide (0.72 mmol: manufactured by Nipponjunryo Chemicals: DABAN) and 0.0361 g of 4,4'-diaminodiphenyl ether (0.18 mmol: manufactured by Tokyo Chemical Industry Co., Ltd.: 4,4'-DDE) (mole ratio [DABAN]:[4,4'-DDE]=8:2) was used as the aromatic diamine instead of the use of 0.2045 g of 4,4'-diaminobenzanilide (0.90 mmol: manufactured by Nipponjunryo Chemicals: DABAN) alone as the aromatic diamine, that the amount of tetramethylurea added as the solvent was changed from 5.24 g to 5.20 g, and that the time for which the raw material mixture liquid was stirred to react the aromatic diamine and the tetracarboxylic dianhydride with each other was changed from 4 hours to 10 hours, in the first step (the step of obtaining a polyamic acid solution). Note that, in this method, the total content ratio of the aromatic diamines (the mixture of DABAN and 4,4'-DDE) and the tetracarboxylic dianhydride (CpODA) in the obtained raw material mixture liquid was 9.5% by mass, and the concentration of the polyamic acid in the polyamic acid solution was 9.5% by mass, as is apparent also from the amounts of the raw materials added. In addition, the viscosity of the polyamic acid solution was 35 cps. Table 1 shows the evaluation results of properties of the thus obtained polyimide film. Note that, by using the thus obtained film, the molecular structure of the compound forming the film was identified. FIG. 3 shows a graph of an IR spectrum obtained during infrared absorption spectrometry (IR measurement) for the identification of the molecular structure. As is apparent from the results shown in FIG. 3, C=O stretching vibration of imidocarbonyl was observed at 1698 cm$^{-1}$ in the graph of the IR spectrum of Example 5. Therefore, the film was certainly confirmed to be a film made of a polyimide.

Example 6

Figure 4:
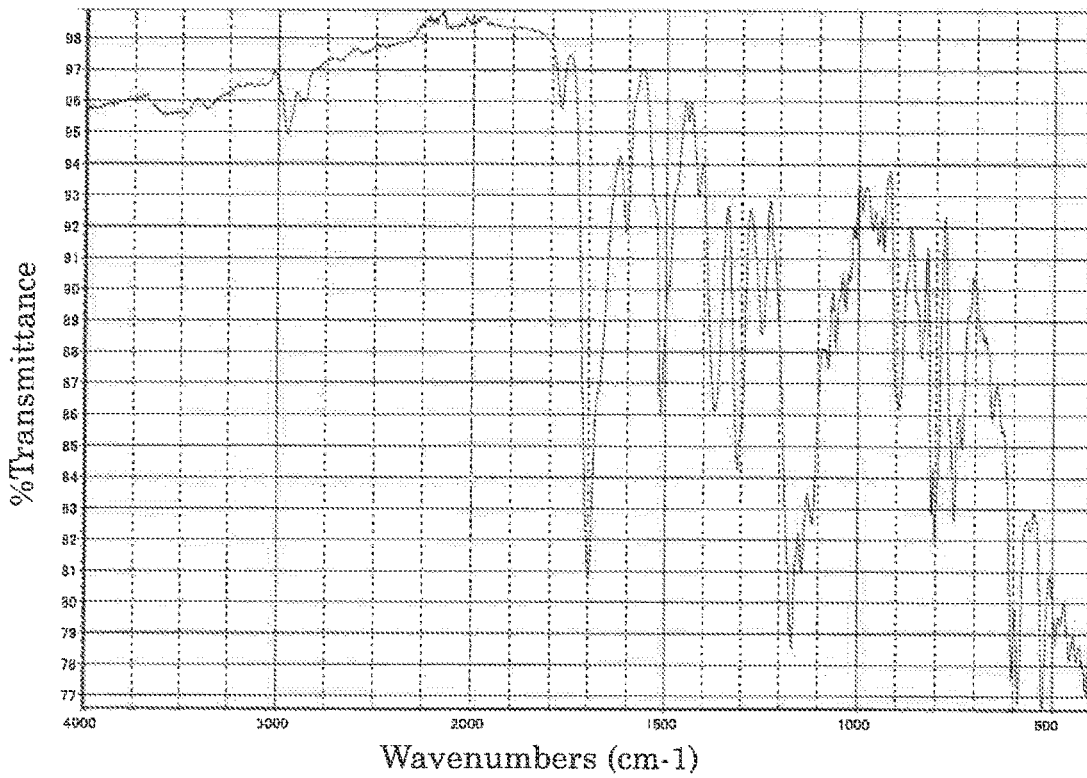
FIG. 4 is a graph showing an IR spectrum of a polyimide obtained in Example 6.

A polyimide film was obtained in the same manner as in Example 1, except that a mixture of 0.1636 g of 4,4'-diaminobenzanilide (0.72 mmol: manufactured by Nipponjunryo Chemicals: DABAN) and 0.0576 g of 2,2'-bis(trifluoromethyl)benzidine (0.18 mmol: manufactured by Wakayama Seika Kogyo Co., Ltd.: TFMB) (mole ratio [DABAN]:[TFMB]=8:2) was used as the aromatic diamine instead of the use of 0.2045 g of 4,4'-diaminobenzanilide (0.90 mmol: manufactured by Nipponjunryo Chemicals: DABAN) alone as the aromatic diamine, that the amount of tetramethylurea added as the solvent was changed from 5.24 g to 5.40 g, and that the time for which the raw material mixture liquid was stirred to react the aromatic diamine and the tetracarboxylic dianhydride with each other was changed from 4 hours to 10 hours, in the first step (the step of obtaining a polyamic acid solution). Note that, in this method, the total content ratio of the aromatic diamines (the mixture of DABAN and TFMB) and the tetracarboxylic dianhydride (CpODA) in the obtained raw material mixture liquid was 9.5% by mass, and the concentration of the polyamic acid in the polyamic acid solution was 9.5% by mass, as is apparent also from the amounts of the raw materials added. In addition, the viscosity of the polyamic acid solution was 29 cps. Table 1 shows the evaluation results of properties of the thus obtained polyimide film. Note that, by using the thus obtained film, the molecular structure of the compound forming the film was identified. FIG. 4 shows a graph of an IR spectrum obtained during infrared absorption spectrometry (IR measurement) for the identification of the molecular structure. As is apparent from the results shown in FIG. 4, C=O stretching vibration of imidocarbonyl was observed at 1700 cm$^{-1}$ in the graph of the IR spectrum of Example 6. Therefore, the film was certainly confirmed to be a film made of a polyimide.

Example 7

Figure 5:
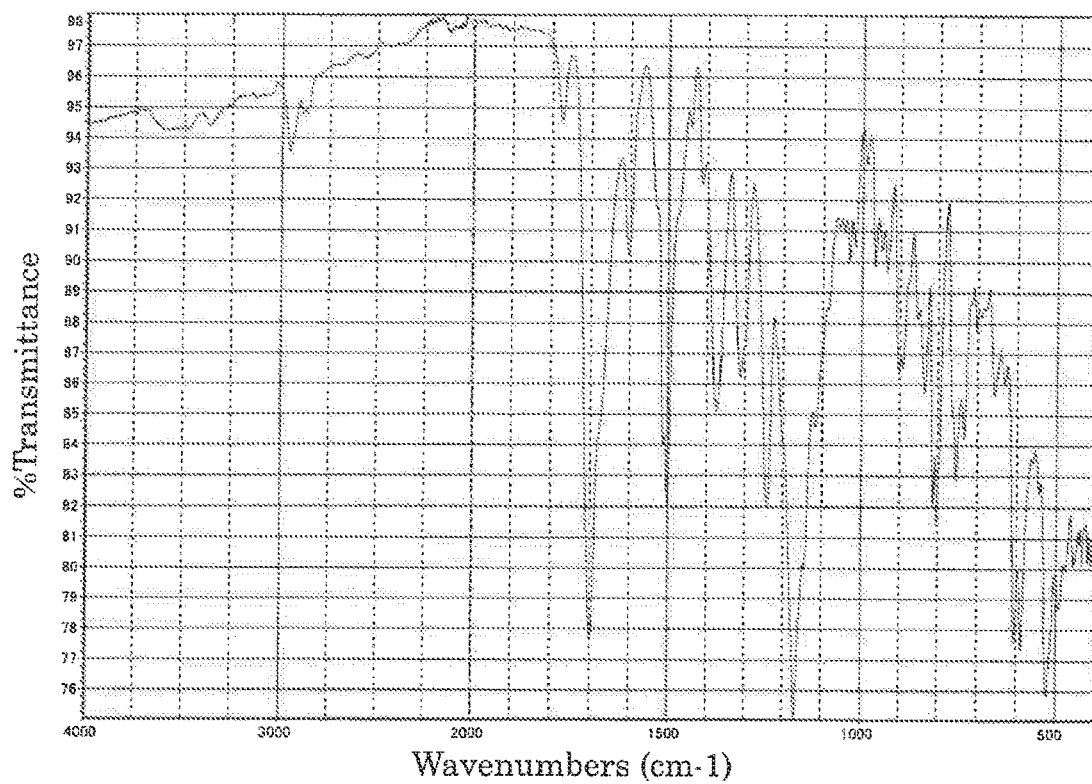
FIG. 5 is a graph showing an IR spectrum of a polyimide obtained in Example 7.

A polyimide film was obtained in the same manner as in Example 1, except that a mixture of 0.1636 g of 4,4'-diaminobenzanilide (0.72 mmol: manufactured by Nipponjunryo Chemicals: DABAN) and 0.0933 g of 2,2'-bis{4-(4-aminophenoxy)phenyl}hexafluoropropane (0.18 mmol: manufactured by Wakayama Seika Kogyo Co., Ltd.: HFBAPP) (mole ratio [DABAN]:[HFBAPP]=8:2) was used as the aromatic diamine instead of the use of 0.2045 g of 4,4'-diaminobenzanilide (0.90 mmol: manufactured by Nipponjunryo Chemicals: DABAN) alone as the aromatic diamine, that the amount of tetramethylurea added as the solvent was changed from 5.24 g to 5.74 g, and that the time for which the raw material mixture liquid was stirred to react the aromatic diamine and the tetracarboxylic dianhydride with each other was changed from 4 hours to 10 hours, in the first step (the step of obtaining a polyamic acid solution). Note that, in this method, the total content ratio of the aromatic diamines (the mixture of DABAN and TFMB) and the tetracarboxylic dianhydride (CpODA) in the obtained raw material mixture liquid was 9.5% by mass, and the concentration of the polyamic acid in the polyamic acid solution was 9.5% by mass, as is apparent also from the amounts of the raw materials added. In addition, the viscosity of the polyamic acid solution was 28 cps. Table 1 shows the evaluation results of properties of the thus obtained polyimide film. Note that, by using the thus obtained film, the molecular structure of the compound forming the film was identified. FIG. 5 shows a graph of an IR spectrum obtained during infrared absorption spectrometry (IR measurement) for the identification of the molecular structure. As is apparent from the results shown in FIG. 5, C=O stretching vibration of imidocarbonyl was observed at 1699 cm$^{-1}$ in the graph of the IR spectrum of Example 7. Therefore, the film was certainly confirmed to be a film made of a polyimide.

Example 8

Figure 6:
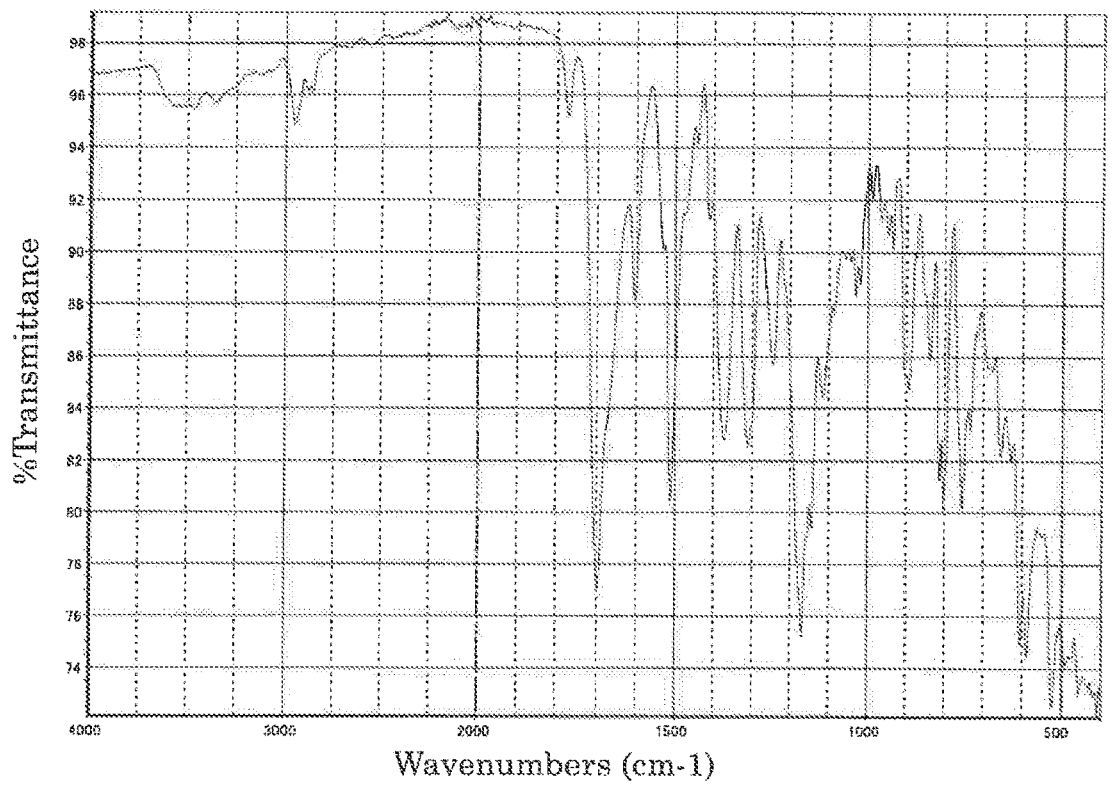
FIG. 6 is a graph showing an IR spectrum of a polyimide obtained in Example 8.

A polyimide film was obtained in the same manner as in Example 1, except that 0.0055 g of a silane coupling agent (3-aminopropyltriethoxysilane: manufactured by Shin-Etsu Chemical Co., Ltd. under the trade name of "KBE-903") was added after the imidazole-based compound (the imidazole-based compound represented by the above-described general formula (13)) was dissolved in the polyamic acid solution in the second step (the step of obtaining a polyimide-forming mixture liquid). Note that the silane coupling agent was an additive (adhesion improvement agent) for improving the adhesion between the glass and the polyimide film. In addition, the viscosity of the obtained polyamic acid solution was 15 cps in the method. Table 1 shows the evaluation results of properties of the thus obtained polyimide film. Note that, by using the thus obtained film, the molecular structure of the compound forming the film was identified. FIG. 6 shows a graph of an IR spectrum obtained during infrared absorption spectrometry (IR measurement) for the identification of the molecular structure. As is apparent from the results shown in FIG. 6, C=O stretching vibration of imidocarbonyl was observed at 1698 cm$^{-1}$ in the graph of the IR spectrum of Example 8. Therefore, the film was certainly confirmed to be a film made of a polyimide.

Comparative Example 1

First, a 30 ml three-necked flask was sufficiently dried by heating with a heat gun. Next, the atmospheric gas in the sufficiently dried three-necked flask was substituted with nitrogen, to create a nitrogen atmosphere inside the three-necked flask. Subsequently, 0.2045 g of 4,4'-diaminobenzanilide (0.90 mmol: manufactured by Nipponjunryo Chemicals: DABAN), which was an aromatic diamine, was introduced into the three-necked flask, and then 2.88 g of tetramethylurea was further added as a solvent, followed by stirring. Thus, a solution was obtained in which the aromatic diamine (DABAN) was dissolved in the solvent.

Next, to the three-necked flask containing the solution, 0.3459 g (0.90 mmol) of the tetracarboxylic dianhydride obtained in Synthesis Example 1 (the compound represented by the above-described general formula (12): CpODA) was added under a nitrogen atmosphere, to prepare a raw material mixture liquid containing the solvent, the aromatic diamine (DABAN), and the tetracarboxylic dianhydride (CpODA) and having a total content ratio of the aromatic diamine (DABAN) and the tetracarboxylic dianhydride (CpODA) of 16% by mass.

Within 10 minutes after the preparation of the raw material mixture liquid as described above, 0.165 g of the imidazole-based compound obtained in Synthesis Example 2 (the imidazole-based compound represented by the above-described general formula (13)) was added to the raw material mixture liquid, followed by stirring under a nitrogen atmosphere at room temperature (25° C.) for 10 hours.

Thus, the aromatic diamine (DABAN) and the tetracarboxylic dianhydride (CpODA) were reacted with each other to obtain a mixture liquid (coating liquid) for polyimide formation containing a polyamic acid and the imidazole-based compound. Note that the viscosity of the mixture liquid for polyimide formation was checked, and the viscosity was 3622 cps. In addition, the total content of the polyamic acid and the imidazole-based compound in the mixture liquid for polyimide formation was 20% by mass.

Subsequently, the obtained mixture liquid for polyimide formation was spin coated onto a surface of a glass substrate (manufactured by Corning Incorporated under the trade name of "EAGLE XG", length: 100 mm, width; 100 mm, thickness: 0.7 mm) made of non-alkaline glass, such that a film having a thickness of 13 μm was obtained after thermal curing. Thus, a coating film was formed on the glass substrate. After that, the glass substrate on which the coating film was formed was placed on a hot plate at 60° C. and allowed to stand for 2 hours, to remove the solvent from the coating film by evaporation (solvent removal treatment). Subsequently, the glass substrate on which the coating film was formed and which was subjected to the solvent removal treatment was introduced into an inert oven through which nitrogen was flowing at a flow rate of 3 L/minute, and allowed to stand in the inert oven under a nitrogen atmosphere and under a temperature condition of 25° C. for 0.5 hours. Then, the coating film was cured by heating under a temperature condition of 135° C. for 0.5 hours, and further heating under a temperature condition of 250° C. for 1 hour to conduct imidization of the polyamic acid. Thus, a film made of a polyimide was formed on the glass substrate. After that, the glass substrate on which the film made of the polyimide was formed was immersed in hot water at 90° C., to detach the polyimide film from the glass substrate. Thus, the polyimide film was obtained. Table 1 shows the evaluation results of properties of the thus obtained polyimide film. Note that, by using the thus obtained film, the molecular structure of the compound forming the film was identified. Since C=O stretching vibration of imidocarbonyl was observed at 1698 $cm^{-1}$ by the IR measurement, the film was certainly confirmed to be a film made of a polyimide.

Comparative Example 2

A polyimide film was obtained in the same manner as in Comparative Example 1, except that the amount of tetramethylurea added as the solvent was changed from 2.88 g to 5.24 g. Note that, in this method, the total content ratio of the aromatic diamine (DABAN) and the tetracarboxylic dianhydride (CpODA) in the obtained raw material mixture liquid was 9.5% by mass, and the total content of the polyamic acid and the imidazole-based compound in the mixture liquid (coating liquid) for polyimide formation was 12% by mass. In addition, the viscosity of the mixture liquid for polyimide formation was 258 cps. Table 1 shows the evaluation results of properties of the thus obtained polyimide film. Note that, by using the thus obtained film, the molecular structure of the compound forming the film was identified. Since C=O stretching vibration of imidocarbonyl was observed at 1698 $cm^{-1}$ by the IR measurement, the film was certainly confirmed to be a film made of a polyimide.

Comparative Example 3

First, a 30 ml three-necked flask was sufficiently dried by heating with a heat gun. Next, the atmospheric gas in the sufficiently dried three-necked flask was substituted with nitrogen, to create a nitrogen atmosphere inside the three-necked flask. Subsequently, 0.2045 g of 4,4'-diaminobenzanilide (0.90 mmol: manufactured by Nipponjunryo Chemicals: DABAN), which was an aromatic diamine, was introduced into the three-necked flask, and then 4.04 g of tetramethylurea was further added as a solvent, followed by stirring. Thus, a solution was obtained in which the aromatic diamine (DABAN) was dissolved in the solvent.

Next, to the three-necked flask containing the solution, 0.3459 g (0.90 mmol) of the tetracarboxylic dianhydride obtained in Synthesis Example 1 (the compound represented by the above-described general formula (12): CpODA) was added under a nitrogen atmosphere, to prepare a raw material mixture liquid containing the solvent, the aromatic diamine (DABAN), and the tetracarboxylic dianhydride (CpODA) and having a total content ratio of the aromatic diamine (DABAN) and the tetracarboxylic dianhydride (CpODA) of 12% by mass.

Subsequently, the obtained raw material mixture liquid was stirred under a nitrogen atmosphere at room temperature (25° C.) for 10 hours to react the aromatic diamine (DABAN) and the tetracarboxylic dianhydride (CpODA) with each other. Thus, a polyamic acid was formed, and a polyamic acid solution was obtained. Note that the concentration of the polyamic acid in the obtained polyamic acid solution was 12% by mass, as is apparent also from the amounts of the raw materials added. Note that the viscosity [cps (centipoise)] of the thus obtained polyamic acid solution (polyamic acid concentration: 12% by mass) was 46 cps. Table 1 shows the properties (viscosity) of the polyamic acid solution.

The polyamic acid solution (polyamic acid concentration: 12% by mass), which was used as it was, was spin coated onto a surface of a glass substrate (manufactured by Corning Incorporated under the trade name of "EAGLE XG", length: 100 mm, width; 100 mm, thickness: 0.7 mm) made of non-alkaline glass, such that a film having a thickness of 13 μm was obtained after thermal curing. Thus, a coating film was formed on the glass substrate. After that, the glass substrate on which the coating film was formed was placed on a hot plate at 60° C. and allowed to stand for 2 hours, to remove the solvent from the coating film by evaporation (solvent removal treatment). Subsequently, the glass substrate on which the coating film was formed and which was subjected to the solvent removal treatment was introduced into an inert oven through which nitrogen was flowing at a flowrate of 3 L/minute, and allowed to stand in the inert oven under a nitrogen atmosphere and under a temperature condition of 25° C. for 0.5 hours. Then, the coating film was cured by heating under a temperature condition of 135° C. for 0.5 hours, and further heating under a temperature condition of 250° C. for 1 hour to conduct imidization of the polyamic acid. Thus, a film made of a polyimide was formed on the glass substrate. However, the obtained film had cracks. Then, the glass substrate on which the film made of the polyimide (having cracks) was formed was immersed in hot water at 90° C. to detach the polyimide film from the glass substrate. Thus, the polyimide film (film with cracks) was obtained. Table 1 shows the evaluation results of properties of the thus obtained polyimide film. Note that Table 1 also shows the presence or absence of cracks in the film obtained in each of Examples and Comparative Examples.

TABLE 1

| | Properties of Polyamic Acid Solution* | | | | | Properties of Coating Liquid Used for Forming Coating Film | | | |
|---|---|---|---|---|---|---|---|---|---|
| | Type of Aromatic Diamine | Stirring Temperature (° C.) | Stirring Time (Reaction Time) | Concentration of Polyamic Acid (% by mass) | Viscosity (cps) | Concentration of Polyimide-Forming Mixture Liquid (% by mass) | Addition of Imidazole-Based Compound | Timing of Addition of Imidazole-Based Compound | Viscosity (cps) |
| Example 1 | DABAN | 25 | 4 Hours | 9.5 | 15 | 12 | Yes | After Formation of Polyamic Acid | 17 |
| Example 2 | DABAN | 25 | 5 Hours | 9.5 | 17 | 12 | Yes | After Formation of Polyamic Acid | 19 |
| Example 3 | DABAN | 25 | 10 Hours | 12 | 46 | 12 | Yes | After Formation of Polyamic Acid | 71 |
| Example 4 | Mixture of DABAN and PPD | 25 | 10 Hours | 9.5 | 24 | 12 | Yes | After Formation of Polyamic Acid | 27 |
| Example 5 | Mixture of DABAN and DDE | 25 | 10 Hours | 9.5 | 35 | 12 | Yes | After Formation of Polyamic Acid | 40 |
| Example 6 | Mixture of DABAN and TFMB | 25 | 10 Hours | 9.5 | 28 | 12 | Yes | After Formation of Polyamic Acid | 33 |
| Example 7 | Mixture of DABAN and HFBAPP | 25 | 10 Hours | 9.5 | 28 | 12 | Yes | After Formation of Polyamic Acid | 32 |
| Example 8 | DABAN | 25 | 4 Hours | 9.5 | 15 | 12 | Yes | After Formation of Polyamic Acid | 16 |
| Comp. Ex. 1 | DABAN | 25 | 10 Hours | — (16) | 3622 | 20 | Yes | Before Formation of Polyamic Acid | 3622 |
| Comp. Ex. 2 | DABAN | 25 | 10 Hours | — (0.5) | 258 | 12 | Yes | Before Formation of Polyamic Acid | 258 |
| Comp. Ex. 3 | DABAN | 25 | 10 Hours | 12 | 46 | 12 | No | — | 46 |

| | Properties of Coating Liquid Used for Forming Coating Film | Properties of Polyimide Film | | | | | | | |
|---|---|---|---|---|---|---|---|---|---|
| | Addition of Adhesion Improvement Agent | Cracks | CTE (ppm/K) | Total Luminous Transmittance (%) | YI | HAZE | Td5% (° C.) | Tg (° C.) | Softening Point (° C.) | Surface Roughness (nm) |
| Example 1 | No | Absent | 15 | 88 | 1.9 | 0.4 | 471 | N.D. | 493 | 1.0 |
| Example 2 | No | Absent | 14 | 88 | 2.0 | 0.4 | 473 | N.D. | 494 | 1.7 |
| Example 3 | No | Absent | 12 | 88 | 3.2 | 0.4 | 488 | N.D. | 487 | 0.8 |
| Example 4 | No | Absent | 13 | 88 | 2.3 | 0.9 | 481 | 444 | 500 | 2.0 |
| Example 5 | No | Absent | 17 | 88 | 2.1 | 1.5 | 497 | 438 | 490 | 2.0 |
| Example 6 | No | Absent | 13 | 86 | 3.2 | 1.5 | 493 | 406 | 497 | 2.0 |
| Example 7 | No | Absent | 19 | 88 | 2.0 | 1.2 | 499 | 356 | 497 | 2.0 |
| Example 8 | Yes | Absent | 14 | 88 | 2.2 | 0.3 | 509 | 459 | 490 | 1.5 |
| Comp. Ex. 1 | No | Absent | 10 | 88 | 2.9 | 0.5 | 499 | N.D. | 501 | 2.5 |
| Comp. Ex. 2 | No | Absent | 12 | 88 | 3.8 | 0.5 | 496 | N.D. | 487 | 2.3 |
| Comp. Ex. 3 | No | Present | Unmeasurable | 87 | 4.1 | 0.6 | 483 | N.D. | 496 | Unmeasurable |

*in the table indicates that the properties of each of Comparative Examples 1 and 2 are those of the coating liquid used for forming the coating film, and further that the numeric value in the parentheses of each of Comparative Examples 1 and 2 in "Concentration of Polyamic Acid" is the concentration of the raw materials before the addition of the imidazole-based compound. Regarding Tg in the table, N.D indicates that no Tg lower than the softening temperature was detected.

As is apparent from the results shown in Table 1, in each of the cases (Examples 1 to 8) where the method for producing a polyimide film of the present invention was used, the surface roughness (arithmetic mean roughness Ra) of the obtained polyimide film was 2.0 nm or less, indicating that the surface of the obtained polyimide film had an extremely high level of smoothness. Note that, in each of the cases (Examples 1 to 8) where the method for producing a polyimide film of the present invention was used, the 5% weight loss temperature (Td5%) of the obtained polyimide film was 350° C. or higher, indicating that the obtained polyimide film had a sufficient heat resistance, and the total luminous transmittance thereof was 80% or higher, indicating that the obtained polyimide film had a sufficient transparency. From these results, it has been found that the polyimide films (Examples 1 to 8) of the present invention are useful especially for various applications where surface smoothness is required.

On the other hand, in each of the methods for producing a polyimide film described in Comparative Examples 1 to 2 in which the imidazole-based compound obtained in Synthesis Example 2 (the imidazole-based compound represented by the above-described general formula (13)) was added to the raw material mixture liquid for preparing the polyamic acid, the viscosity of the coating liquid (at the stage where the polyamic acid was formed) was 258 cps or higher. Considering these results and the results of Examples together, it has been found that the addition of the imidazole-based compound represented by the above-described general formula (13) at the stage after formation of the polyamic acid makes it possible to produce a polyimide film having a higher surface smoothness. Regarding these results, the present inventors speculate that the surface smoothnesses of the films did not reach the high level as in Examples for the following reason. Specifically, as for Comparative Example 2, since the imidazole-based compound represented by the above-described general formula (13) was added at the production of the polyamic acid, the increase in molecular weight proceeded to a higher degree in this case than in the case where the imidazole-based compound was added after formation of the polyamic acid, and the viscosity of the coating liquid increased. Meanwhile, as for Comparative Example 1, since the imidazole-based compound represented by the above-described general formula (13) was added at the production of the polyamic acid, and also the concentration of the raw material took a high value of 16% by mass, the viscosity of the coating liquid further increased. Because of the increase in viscosity, each of the coating liquids was unfavorable for forming a coating film in terms of the flowability, uniform coatability, and leveling properties in comparison with the low-viscosity coating liquids.

In addition, as is apparent also from the results of Comparative Example 3, cracks were formed in the obtained polyimide film. Accordingly, it has been found that, even when a polyamic acid solution having a sufficiently low viscosity is obtained, it is difficult to form a film having a sufficient mechanical strength, i.e., film formation is difficult, if the imidazole-based compound represented by the above-described general formula (13) is not added. Note that a comparison between Example 3 and Comparative Example 3, which were different in terms of the presence or absence of the use of the imidazole-based compound represented by the above-described general formula (13), shows that the use of the imidazole-based compound represented by the above-described general formula (13) makes it possible to efficiently produce a sufficiently uniform polyimide film (a crack-free film having a sufficient mechanical strength) from a low-viscosity polyamic acid solution.

From these results, it has been found that the method for producing a polyimide film of the present invention (Examples 1 to 8) makes it possible to form a crack-free uniform film, and efficiently produce a polyimide film having a higher surface smoothness.

Examples 9 to 12: Preparation of Photosensitive Compositions

Photosensitive compositions having a polyamic acid concentration of 10% by mass were prepared by dissolving the components listed in Table 2 (the components expressed by abbreviations such as PAA-1 in the table) in tetramethylurea. In Table 2, the numeric values in the brackets are expressed in parts by mass. In addition, the abbreviations shown in Table 2 mean components described below.

TABLE 2

| | Polyamic acid | Imidazole-based compound | Photosensitive agent | Additives |
|---|---|---|---|---|
| Example 9 | PAA-1[100] | I-1[25] | PAC-1[11] | Si-1[6] and Si-2[3] |
| Example 10 | PAA-1[100] | I-1[25] | PAC-2[11] | Si-1[6] and Si-2[3] |
| Example 11 | PAA-1[100] | I-1[25] | PAC-1[0.5] and PAC-2[10.5] | Si-1[6] and Si-2[3] |
| Example 12 | PAA-2[100] | I-1[25] | PAC-1[11] | Si-1[6] and Si-2[3] |

[Regarding Abbreviations in Table 2]
PAA-1: A polyamic acid (solid) obtained in the same manner as in the first step of Example 1
PAA-2: A polyamic acid (solid) obtained in the same manner as in the first step of Example 5
I-1: A compound represented by general formula (13)
PAC-1: A compound represented by the following formula (P-1), in which Qs comprises the substituent represented by the following formula (Q-1) and hydrogen atoms at a ratio of 9:1 (mole ratio).
[Chem 21]

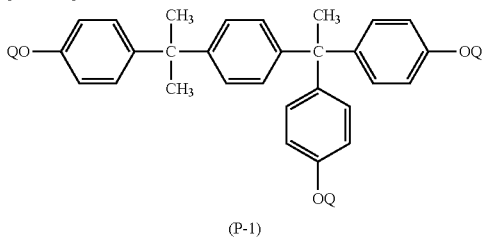

(P-1)

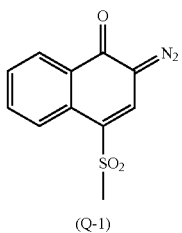

(Q-1)

PAC-2: A compound represented by the above-described formula (P-1), in which Qs comprises the substituent represented by the following formula (Q-2) and hydrogen atoms at a ratio of 9:1 (mole ratio).
[Chem 22]

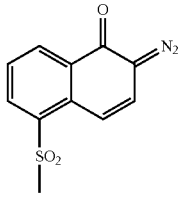

(Q-2)

Si-1: $(HOCH_2CH_2)_2N(CH_2)_3Si(OCH_2CH_2CH_3)_3$
Si-2: $H_2NCONH(CH_2)_3Si(OCH_2CH_2CH_3)_3$

<Production of Cured Patterned Film>

Each of the photosensitive compositions having the constitutions listed in Table 2 was spin coated onto a silicon wafer, and dried at 80° C. to obtain a composition film. Subsequently, each of the composition films was exposed to light by using an ultra-high-pressure mercury lamp (EXM-1066-E01: ORC MANUFACTURING CO., LTD., energy doses: 10 doses in total in the range from 100 to 1000 mJ/cm$^2$ with increments of 100 mJ/cm$^2$) through masking. Then, a pattern was formed by performing development using 2.38% by mass TMAH (tetramethylammonium hydroxide) until the portions exposed to the light were dissolved. Next, each of the patterned films was heated under a nitrogen atmosphere at 150° C. for 1 hour, and then further heated at 250° C. for 1 hour. Thus, a cured patterned film having a thickness of approximately 13 μm was obtained from each of the photosensitive compositions listed in Table 2.

INDUSTRIAL APPLICABILITY

As described above, according to the present invention, it is possible to provide a method for producing a polyimide film which makes it possible to efficiently produce a film having a higher surface smoothness, a polyimide film obtained by using the production method, a polyamic acid solution preferably usable for producing the polyimide film, and a photosensitive composition comprising the polyamic acid solution. In addition, the photosensitive composition of the present invention makes it possible to efficiently produce a cured patterned film.

Accordingly, the method for producing a polyimide film of the present invention is especially useful as a method for producing polyimide films used in applications where high surface smoothness is required (for example, a substrate of an organic EL element, a substrate of an flexible organic EL element, a TFT substrate of an organic EL element, a color filter substrate of an organic EL element, a touch panel substrate of an organic EL element, a substrate for a high-definition display for medical use or the like, and the like) or as the like.

The invention claimed is:
1. A method for producing a polyimide film, comprising the steps of:
obtaining a polyamic acid solution having a viscosity of 5 to 150 cps by preparing a raw material mixture liquid that contains
a solvent,
a tetracarboxylic dianhydride represented by the following general formula (1):

[Chem 1]

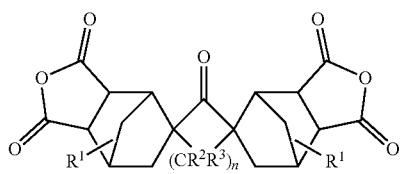
(1)

[in the formula (1), $R^1$, $R^2$, and $R^3$ each independently represent one selected from the group consisting of a hydrogen atom, alkyl groups having 1 to 10 carbon atoms, and a fluorine atom, and n represents an integer of 0 to 12], and
an aromatic diamine represented by the following general formula (2):

[Chem 2]

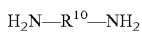
$H_2N—R^{10}—NH_2$ (2)

[in the formula (2), $R^{10}$ represents an arylene group having 6 to 50 carbon atoms], and that has a total content of the tetracarboxylic dianhydride and the aromatic diamine of 15% by mass or less, and reacting the tetracarboxylic dianhydride and the aromatic diamine with each other in the raw material mixture liquid to form a polyamic acid having a repeating unit represented by the following general formula (3):

[Chem 3]

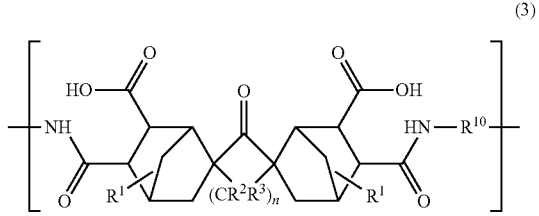
(3)

[in the formula (3), $R^1$, $R^2$, and $R^3$ each independently represent one selected from the group consisting of a hydrogen atom, alkyl groups having 1 to 10 carbon atoms, and a fluorine atom, $R^{10}$ represents an arylene group having 6 to 50 carbon atoms, and n represents an integer of 0 to 12];
obtaining a polyimide-forming mixture liquid by adding, to the polyamic acid solution, a compound represented by the following general formula (4):

[Chem 4]

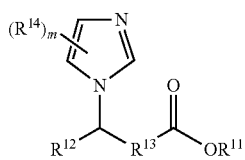
(4)

[in the formula (4), $R^{11}$ represents one selected from the group consisting of a hydrogen atom and alkyl groups, $R^{12}$ represents an optionally substituted aromatic group, $R^{13}$ represents an optionally substituted alkylene group, $R^{14}$s each independently represent one selected from the group consisting of halogen atoms, a hydroxy group, a mercapto group, a sulfide group, a silyl group, a silanol group, a nitro group, a nitroso group, a sulfonato group, a phosphino group, a phosphinyl group, a phosphonato group, and organic groups, and m represents an integer of 0 to 3]; and
obtaining a film made of a polyimide having a repeating unit represented by the following general formula (5):

[Chem 5]

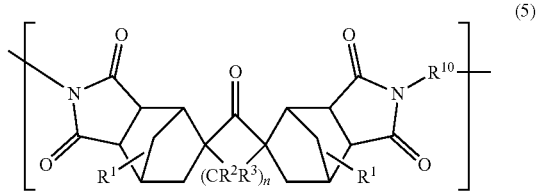
(5)

[in the formula (5), $R^1$, $R^2$, and $R^3$ each independently represent one selected from the group consisting of a hydrogen atom, alkyl groups having 1 to 10 carbon atoms, and a fluorine atom, $R^{10}$ represents an arylene group having 6 to 50 carbon atoms, and n represents an integer of 0 to 12]
by forming a film made of the polyimide-forming mixture liquid, followed by imidization of the polyamic acid in the film.

2. The method for producing a polyimide film according to claim 1, wherein the polyamic acid solution has a viscosity of 10 to 100 cps.

3. The method for producing a polyimide film according to claim 1, wherein
the tetracarboxylic dianhydride and the aromatic diamine are reacted with each other in the raw material mixture liquid by stirring the raw material mixture liquid under a temperature condition of 0 to 50° C. for 0.5 to 24 hours.

4. A polyimide film, which is obtained by the method for producing a polyimide film according to claim 1.

5. The polyimide film according to claim 4, wherein
the polyimide film has a surface arithmetic mean roughness Ra of 0.01 to 2.0 nm.

6. A polyamic acid solution, comprising:
a solvent;
a polyamic acid having a repeating unit represented by the following general formula (3):

[Chem 6]

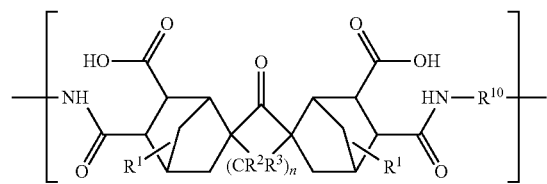

(3)

[in the formula (3), $R^1$, $R^2$, and $R^3$ each independently represent one selected from the group consisting of a hydrogen atom, alkyl groups having 1 to 10 carbon atoms, and a fluorine atom, $R^{10}$ represents an arylene group having 6 to 50 carbon atoms, and n represents an integer of 0 to 12]; and a compound represented by the following general formula (4):

[Chem 7]

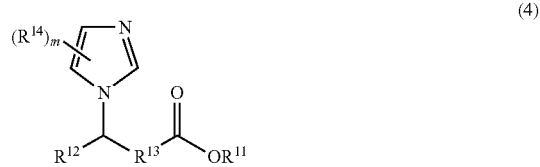

(4)

[in the formula (4), $R^{11}$ represents one selected from the group consisting of a hydrogen atom and alkyl groups, $R^{12}$ represents an optionally substituted aromatic group, $R^{13}$ represents an optionally substituted alkylene group, $R^{14}$s each independently represent one selected from the group consisting of halogen atoms, a hydroxy group, a mercapto group, a sulfide group, a silyl group, a silanol group, a nitro group, a nitroso group, a sulfonato group, a phosphino group, a phosphinyl group, a phosphonato group, and organic groups, and m represents an integer of 0 to 3], wherein
the polyamic acid solution has a viscosity of 5 to 150 cps.

7. A photosensitive composition, comprising:
the polyamic acid solution according to claim 6; and
a photosensitive agent.

* * * * *